United States Patent
Deghel et al.

(10) Patent No.: US 12,289,722 B2
(45) Date of Patent: Apr. 29, 2025

(54) ENHANCED UPLINK CONTROL INFORMATION MAPPING TO UPLINK CHANNEL ALLOCATIONS

(71) Applicant: Nokia Technologies Oy, Espoo (FI)

(72) Inventors: Matha Deghel, Paris (FR); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/926,408

(22) Filed: Oct. 25, 2024

(65) Prior Publication Data
US 2025/0048360 A1    Feb. 6, 2025

Related U.S. Application Data

(63) Continuation of application No. PCT/EP2022/062320, filed on May 6, 2022.

(51) Int. Cl.
| | |
|---|---|
| *H04W 16/28* | (2009.01) |
| *H04W 72/0446* | (2023.01) |
| *H04W 72/1268* | (2023.01) |
| *H04W 72/21* | (2023.01) |

(52) U.S. Cl.
CPC ... *H04W 72/1268* (2013.01); *H04W 72/0446* (2013.01)

(58) Field of Classification Search
CPC .................. H04W 72/1268; H04W 72/0446
See application file for complete search history.

(56) References Cited

U.S. PATENT DOCUMENTS

| | | | |
|---|---|---|---|
| 2024/0008035 A1* | 1/2024 | Dai | ............ H04L 1/1812 |
| 2024/0064743 A1* | 2/2024 | Si | ............ H04L 1/1671 |

FOREIGN PATENT DOCUMENTS

WO     WO-2024195103 A1 *  9/2024

OTHER PUBLICATIONS

Vivo, "Views on UL Precoding Indication for Multi-Panel Transmission," 3GPP TSG RAN WG1 #109-e, R1-2203546, May 9-20, 2022.
Lenovo, "UL Precoding Indication for Multi-Panel Transmission," 3GPP TSG RAN WG1#109-e, R1-2204167, May 9-20, 2022.

* cited by examiner

*Primary Examiner* — Melvin C Marcelo
(74) *Attorney, Agent, or Firm* — McCarter & English, LLP

(57) ABSTRACT

A method includes determining, by a user device in a wireless network, at least two physical uplink shared channel (PUSCH) allocations overlapping in time domain and corresponding to at least two PUSCH transmissions for use in transmitting at least one uplink control information (UCI); and mapping, by the user device, the at least one UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one an indication received by the user device from a network node, and wherein each of the at least two PUSCH allocations includes resources allocated to the user device for a PUSCH transmission.

20 Claims, 7 Drawing Sheets

ENHANCED UPLINK CONTROL INFORMATION MAPPING TO UPLINK CHANNEL ALLOCATIONS

RELATED APPLICATION

This application is a Continuation of International Application No. PCT/EP2022/062320, filed on May 6, 2022. The contents of the aforementioned application are hereby incorporated by reference in their entirety.

TECHNICAL FIELD

This description relates to wireless communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations or access points (APs), which are referred to as enhanced Node AP (eNBs), provide wireless access within a coverage area or cell. In LTE, mobile devices, or mobile stations are referred to as user equipments (UE). LTE has included a number of improvements or developments. Aspects of LTE are also continuing to improve.

5G New Radio (NR) development is part of a continued mobile broadband evolution process, similar to earlier evolution of 3G & 4G wireless networks. In addition, 5G is also targeted at the new emerging use cases in addition to mobile broadband. A goal of 5G is to provide significant improvement in wireless performance, which may include new levels of data rate, latency, reliability, and security. 5G NR may also scale to efficiently connect the massive Internet of Things (IoT) and may offer new types of mission-critical services. For example, ultra-reliable and low-latency communications (URLLC) devices may require high reliability and very low latency.

SUMMARY

According to an example embodiment, a method may include includes determining, by a user device in a wireless network, at least two physical uplink shared channel (PUSCH) allocations overlapping in time domain and corresponding to at least two PUSCH transmissions for use in transmitting at least one uplink control information (UCI); and mapping, by the user device, the at least one UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one an indication received by the user device from a network node, and wherein each of the at least two PUSCH allocations includes resources allocated to the user device for a PUSCH transmission.

According to another example embodiment, a method may include transmitting, by a network node to a user device, downlink control information including information indicating at least two time-domain overlapping physical uplink shared channel (PUSCH) allocations that may be used by the user device to transmit at least one uplink control information (UCI); receiving, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; wherein the at least one UCI has been mapped based on at least one of: one or more configured or pre-defined rules, or at least one indication provided by the network node to the user device, and wherein a PUSCH allocation includes resources allocated to the user device for a PUSCH transmission.

Additional example embodiments are provided corresponding to each of the methods, including at least the following for each of the methods: An apparatus that include means for performing each of the methods; An apparatus including at least one processor; and at least one memory including computer program code; the at least one memory and the computer program code configured to, with the at least one processor, cause the apparatus at least to perform the method; And, a non-transitory computer-readable storage medium comprising instructions stored thereon that, when executed by at least one processor, are configured to cause a computing system to perform the method.

According to an example embodiment, an apparatus includes: at least one processor; and at least one memory including computer program code; the at least one memory and the computer program code configured to, with the at least one processor, cause the apparatus at least to: determine, by a user device in a wireless network, at least two time-domain overlapping physical uplink shared channel (PUSCH) allocations corresponding to at least two PUSCH transmissions for use in transmitting at least one uplink control information (UCI); and map, by the user device, the UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

According to an example embodiment, an apparatus includes: a non-transitory computer-readable storage medium comprising instructions stored thereon that, when executed by at least one processor, are configured to cause a computing system to: determine, by a user device in a wireless network, at least two time-domain overlapping physical uplink shared channel (PUSCH) allocations corresponding to at least two PUSCH transmissions for use in transmitting at least one uplink control information (UCI); and map, by the user device, the UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

According to an example embodiment, an apparatus includes: means for determining, by a user device in a wireless network, at least two time-domain overlapping physical uplink shared channel (PUSCH) allocations corresponding to at least two PUSCH transmissions for use in transmitting at least one uplink control information (UCI); and means for mapping, by the user device, the UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

According to an example embodiment, an apparatus includes: at least one processor; and at least one memory including computer program code; the at least one memory and the computer program code configured to, with the at least one processor, cause the apparatus at least to: transmit, by a network node to a user device, downlink control information including information indicating at least two time-domain overlapping physical uplink shared channel (PUSCH) allocations that may be used by the user device to transmit at least one uplink control information (UCI); and, receive, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; wherein the at least one UCI has been mapped based on at least one of: one or more configured or pre-defined rules, or at least one indication provided by the network node to the user device, and wherein a PUSCH allocation includes resources allocated to the user device for a PUSCH transmission.

According to an example embodiment, an apparatus includes: a non-transitory computer-readable storage medium comprising instructions stored thereon that, when executed by at least one processor, are configured to cause a computing system to: transmit, by a network node to a user device, downlink control information including information indicating at least two time-domain overlapping physical uplink shared channel (PUSCH) allocations that may be used by the user device to transmit at least one uplink control information (UCI); and, receive, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; wherein the at least one UCI has been mapped based on at least one of: one or more configured or pre-defined rules, or at least one indication provided by the network node to the user device, and wherein a PUSCH allocation includes resources allocated to the user device for a PUSCH transmission.

According to an example embodiment, an apparatus includes: means for transmitting, by a network node to a user device, downlink control information including information indicating at least two time-domain overlapping physical uplink shared channel (PUSCH) allocations that may be used by the user device to transmit at least one uplink control information (UCI); and, means for receiving, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; wherein the at least one UCI has been mapped based on at least one of: one or more configured or pre-defined rules, or at least one indication provided by the network node to the user device, and wherein a PUSCH allocation includes resources allocated to the user device for a PUSCH transmission.

The details of one or more examples of embodiments are set forth in the accompanying drawings and the description below. Other features will be apparent from the description and drawings, and from the claims.

DETAILED DESCRIPTION

Figure 1:
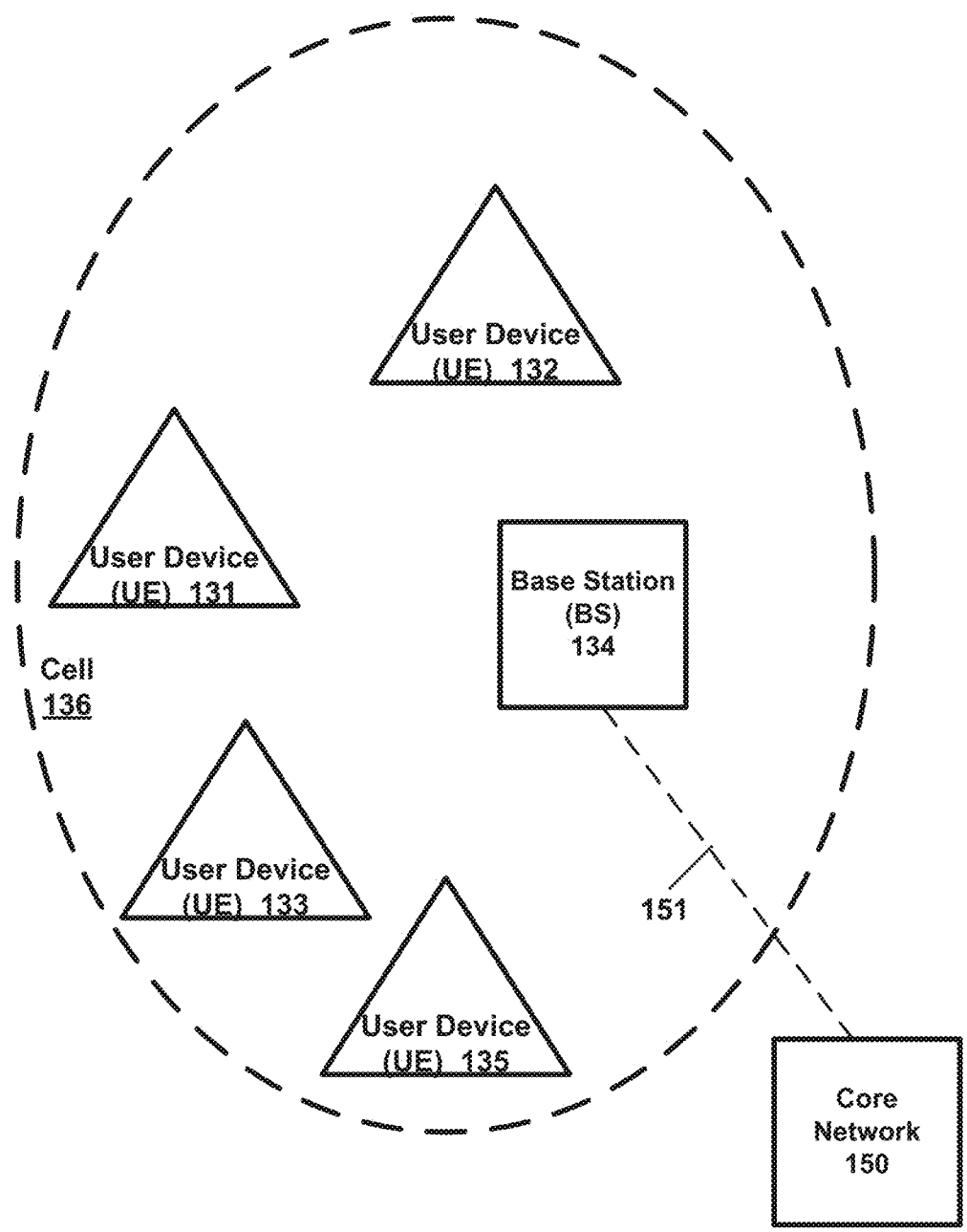
FIG. 1 is a block diagram of a wireless network according to an example embodiment.

FIG. 1 is a block diagram of a wireless network 130 according to an example embodiment. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), or a next generation Node B (gNB). The terms user device and user equipment (UE) may be used interchangeably. A BS may also be referred to as a RAN (radio access network) or NG-RAN (next generation radio access network) node. At least part of the functionalities of a BS (e.g., AP, gNB, eNB, RAN node) may also be carried out by one or more network nodes, servers or hosts, such as a centralized unit (CU) and a distributed unit (DU) in a split RAN architecture, which may be operably coupled to a remote transceiver, such as a remote radio head (RRH). BS 134 provides wireless coverage within a cell 136, including to user devices 131, 132, 133 and 135. Although only four user devices are shown as being connected or attached to BS 134, any number of user devices may be provided. BS 134 is also connected to a core network 150 via a SI interface 151. This is merely one simple example of a wireless network, and others may be used.

According to an illustrative example, a BS (e.g., AP, eNB, gNB, RAN node) may be part of a mobile telecommunication system. A RAN may include one or more RAN nodes (e.g., AP, BSs, eNBs, gNBs) that implement a radio access technology, e.g., to allow one or more UEs to have access to a network or core network. Thus, the RAN nodes reside between one or more user devices or UEs and a core network. According to an example embodiment, each RAN node may provide one or more wireless communication services for one or more UEs or user devices, e.g., to allow the UEs to have wireless access to a network, via the RAN node. Each RAN node may perform or provide wireless communication services, e.g., such as allowing UEs or user devices to establish a wireless connection to the RAN node, and sending data to and/or receiving data from one or more of the UEs. For example, after establishing a connection to a UE, a RAN node may forward data to the UE that is received from a network or the core network, and/or forward data received from the UE to the network or core network. RAN nodes may perform a wide variety of other wireless functions or services, e.g., such as broadcasting control information (e.g., such as system information) to UEs, paging UEs when there is data to be delivered to the UE, assisting in handover of a UE between cells, scheduling of resources for uplink data transmission from the UE(s) and downlink data transmission to UE(s), sending control information to configure one or more UEs, and the like. These are a few examples of one or more functions that a RAN node may perform.

A user device (user terminal, user equipment (UE), mobile terminal, handheld wireless device, etc.) may refer to a portable computing device that includes wireless mobile communication devices operating either with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, a sensor, a wearable device, as examples, or any other wireless device. It should be appreciated that a user device may also be (or may include) a nearly exclusive uplink only device, of which an example is a camera or video camera loading images or video clips to a network.

Core network 150 may include a mobility management entity (MME) or an access and mobility management function (AMF), which may control access to the network, and handle or assist with mobility/handover of user devices between BSs, one or more gateways that may forward data between the BSs and a packet data network or the Internet, and other control nodes, functions or blocks.

In addition, by way of illustrative example, the various example embodiments or techniques described herein may be applied to various types of user devices or data service types, or may apply to user devices that may have multiple applications running thereon that may be of different data service types. New Radio (5G) development may support a number of different applications or a number of different data service types, such as for example: machine type communications (MTC), enhanced machine type communication (eMTC), Internet of Things (IoT), and/or narrowband IoT user devices, enhanced mobile broadband (eMBB), and ultra-reliable and low-latency communications (URLLC). Many of these new 5G (NR)—related applications may require generally higher performance than previous wireless networks.

IoT may refer to an ever-growing group of objects that may have Internet or network connectivity, so that these objects may send information to and receive information from other network devices. For example, many sensor type applications or devices may monitor a physical condition or a status, and may send a report to a server or other network device, e.g., when an event occurs. Machine Type Communications (MTC, or Machine to Machine communications) may, for example, be characterized by fully automatic data generation, exchange, processing and actuation among intelligent machines, with or without intervention of humans. Enhanced mobile broadband (eMBB) may support much higher data rates than currently available in LTE.

Ultra-reliable and low-latency communications (URLLC) is a new data service type, or new usage scenario, which may be supported for New Radio (5G) systems. This enables emerging new applications and services, such as industrial automations, autonomous driving, vehicular safety, e-health services, and so on. 3GPP targets in providing connectivity with reliability corresponding to block error rate (BLER) of 10-5 and up to 1 ms U-Plane (user/data plane) latency, by way of illustrative example. Thus, for example, URLLC user devices/UEs may require a significantly lower block error rate than other types of user devices/UEs as well as low latency (with or without requirement for simultaneous high reliability). Thus, for example, a URLLC UE (or URLLC application on a UE) may require much shorter latency, as compared to a eMBB UE (or an eMBB application running on a UE).

The various example embodiments may be applied to a wide variety of wireless technologies or wireless networks, such as LTE, LTE-A, 5G/New Radio (NR), or any other wireless network or wireless technology operating on cmWave and/or mmWave bands, and to a wide variety of communication services, such as IoT, MTC, eMTC, eMBB, URLLC, etc. These example networks, technologies or data service types are provided only as illustrative examples.

A UE may be configured by a gNB (or other network node) to perform different measurements and measurement reporting to the network (or gNB(s)). A configuration of a UE to perform reference signal (or beam) measurement (e.g., such as CSI-RS measurement for different beams) and reporting may be performed by a gNB sending a report configuration (e.g., such as a CSI-Report-Config) to the UE. A report configuration, for example, may indicate downlink resource(s) on which measurements should be performed (e.g., CSI-RS reference signals/SSBs, or beams), specific quantities or parameters to be measured, and how the reporting is to be performed, such as when the reporting is done, etc.

A UE may measure a signal parameter(s) (e.g., such as a reference signal received power (RSRP)) of each of a plurality of downlink reference signals (e.g., such as synchronization signal block/SSB signals, or channel state information (CSI)-reference signals (CSI-RS)) received by the UE from the gNB/network node (or BS), where each reference signal may be transmitted by the gNB via a different gNB transmit beam (or via a different downlink DL reference signal). The UE may determine the strongest beams or reference signals (e.g., having a highest RSRP), and then may send a measurement report to the gNB that may identify the strongest N DL reference signals (or beams), and the RSRP (or other measured signal parameter) of these N beams, for example. The gNB may use this measurement report to determine what beam to use to communicate with the UE, for example.

According to an example embodiment, a PDCCH (physical downlink control channel) may be transmitted using 1, 2, 4, 8 or 16 contiguous control-channel elements (CCEs), where the number of CCEs may be referred to as the aggregation level (or CCE aggregation level). According to an example embodiment, a CCE is a building block of a PDCCH, where a CCE may be a smallest set of resources that can be used for a PDCCH. For example, a CCE may be a unit upon which search spaces for blind decoding may be defined. Thus, each PDCCH may include one or more CCEs, depending on the aggregation level. According to an example embodiment, a CCE may include 6 resource element groups (REGs), each of which may include one resource block in an OFDM symbol.

A search space may include a set of candidate PDCCHs (candidate downlink control channels) formed by CCEs at given aggregation level(s), which the UE is supposed to attempt to decode. A UE may have multiple search spaces for different purposes (such as different common search spaces, and user-specific search spaces). A search space may include one or more control resource sets (CORESETs). A CORESET may be (or may include) the time-frequency resources upon which a PDCCH(s) is transmitted. There can be multiple search spaces using a same control resource set (CORESET), and there can be multiple CORESETs configured for a UE. Also, a control resource set (CORESET) may be (or may include) time-frequency resources in which the UE tries to decode candidate PDCCHs using one or more search spaces.

In addition, transmission configuration indication (TCI) states may be used by a network node (gNB or BS) within a control resource set (or CORESET) to provide beam indications for the UE, which may identify a beam the UE should use for uplink communication and/or downlink communication with the network node or gNB. Each TCI state may be configured or associated with a transmit beam/receive beam pair. Thus, each TCI state may be associated with a particular beam or a specific reference signal. For example, TCI state 1 may be associated with (or may be used to indicate) CSI-RS #5, TCI state 2 may be associated with CSI-RS #9, etc. (where CSI-RS #5, and CSI-RS #9 may be DL reference signals transmitted by the gNB. Thus, in this manner, each TCI state may be associated (or the TCI state may indicate) with a specific reference signal and/or a specific beam. For example, for data transmission via a physical downlink shared channel (PDSCH) and/or via physical uplink shared channel (PUSCH), a UE may be configured by gNB via radio resource control (RRC) message with 128 candidate TCI states. Then, gNB may configure the UE with up to, e.g., 8 (or other number) activated TCI states via a MAC (media access control) control element (MAC CE) that may be piggy-backed (or appended to) a DL (downlink) data transmission to the UE via PDSCH (physical downlink shared channel). Thus, in this manner the gNB may send an activation message to activate (within the UE) the 8 (for example) indicated TCI states of the 128 (for example) candidate TCI states. The UE may be requested by the network node to use a beam associated with any of these 8 (or other number) activated TCI states for communication with the network node or gNB (e.g., for transmitting or receiving data).

Dynamically (e.g., such as provided within downlink control information/DCI of each subframe or slot), the gNB may indicate a selection of one of the activated TCI states (and thus, identify a selected beam) for the UE to use for an uplink or downlink data communication (e.g., for a scheduled uplink (UL) or downlink (DL) communication, via PDSCH and/or PUSCH). The DCI (which may, at least in some cases, identify a selected activated TCI state for the UE to use for a communication) may be provided within the PDCCH (physical downlink control channel) transmitted to the UE, e.g., as part of each slot or subframe. In this manner, in some cases, the DCI may be used to provide a fast beam indication, that indicates a selected TCI state (e.g., of a plurality of activated TCI states) that is associated with a reference signal or beam to be used by the UE for UL or DL data communication with the network node (BS or gNB). A UE may also receive control information (e.g., via radio resource control (RRC) message) indicating a selected TCI state (and thus, beam) to be used by the UE to receive a PDCCH for each CORESET. Thus, each CORESET may be configured with a TCI state.

Release 16 of NR provided support for single cell downlink multi-transmission reception points (multi-TRP) (or multiple transmission points), which provides the possibility of downlink data to be transmitted via PDSCH (physical downlink shared channel) simultaneously from two different transmission points (TRPs), which may be separated geographically, but are provided within the same cell (e.g., transmissions of downlink data from two different radio heads or other nodes to a UE within a cell).

In addition, Rel-17 introduces a unified TCI framework meaning that TCI states providing QCL assumptions for the reception of DL signals and channels would be used also to provide spatial sources for the transmission of UL signals and channels. Furthermore, the unified TCI framework defines the concept of indicated TCI state. The indicated TCI state can be joint DL and UL TCI state or separate DL and separate UL TCI states. Indicated TCI state provides QCL source (DL) and spatial source (UL) for the set of downlink signals and channels and for the set of uplink signals and channels, respectively. In Rel-17 there can be one indicated joint DL and UL or one indicated DL and one indicated UL TCI state for the UE.

For example, a unified TCI framework may include the following functionalities at a high level: a common TCI state (e.g., indicated TCI) for a set of signals and channels at a time; a TCI state can be joint DL/UL TCI state, separate DL TCI state and/or a separate UL TCI state; RRC configures set (or pool) of joint and/or separate TCI states; MAC (media access control entity) activates a number (e.g., 8) of joint and/or separate TCI states; before first indication, first activated TCI state is the current indicated TCI state; DCI (downlink control information, e.g., provided by gNB via physical downlink control channel (PDCCH) to UE) indicates one of the activated TCI states to be indicated TCI state (which may be a common TCI state); on the DCI-based TCI state indication: DCI format 1_1/1_2 with and without DL assignment may be used to carry the TCI state indication; an indication confirmed by HARQ ACK (HARQ acknowledgement feedback, to acknowledge data received by UE) by UE; application time of the beam indication: the first slot that is at least X ms or Y symbols after the last symbol of the acknowledgment of the joint or separate DL/UL beam indication; TCI field codepoint: Joint: TCI state for both DL and UL; Separate: a pair of DL TCI state and UL TCI state; a DL TCI state (keep the current UL TCI state); an UL TCI state (keep the current DL TCI state); Unified TCI framework will be extended in Rel-18 so that there can be then multiple indicated DL and UL TCI states;

In addition, a UE may transmit uplink (UL) control information (UCI) to a gNB via a physical uplink control channel (PUCCH). UCI may include, e.g., one or more of: 1) Hybrid ARQ acknowledgement (HARQ-ACK) feedback for received downlink data (to acknowledge receipt of DL (downlink) data); 2) channel state information (CSI) related to downlink channel conditions, e.g., used by the gNB to assist downlink scheduling including multi-antenna and beamforming schemes; and/or, 3) scheduling requests indicating that the UE needs or is requesting uplink resources for an uplink transmission to the gNB (e.g., requesting a PUSCH allocation).

Furthermore, a UE may transmit data to a gNB or network node via a physical uplink shared channel (PUSCH). A valid scheduling grant or PUSCH allocation (which provides the UE with an allocation of time-frequency resources that may be used by the UE for UL transmission) may be required for the UE to transmit uplink data to the gNB.

The PUCCH may be the basis for transmission of uplink control information (UCI) to the gNB. For example, in some cases, the UE may transmit UCI to the gNB via the PUCCH, regardless of whether the UE has received a PUSCH allocation for transmission of UL data. However, in some cases, if the PUCCH and PUSCH overlap in time (such as for a situation where the UE has received a valid grant or PUSCH allocation), the UE may transmit the UCI on or within the PUSCH (e.g., by piggy-backing the UCI on the PUSCH), which may include the UE multiplexing the UCI with UL data onto the PUSCH, to allow both data and UCI to be transmitted via the PUSCH. Thus, by multiplexing the UCI with data on the PUSCH (or piggy-backing the UCI with data over the PUSCH), this may provide a more efficient transmission of data and UCI.

In some cases, explicit configuration/scheduling of CSI on PUSCH is only possible for semi-persistent and aperiodic CSI reporting. When a PUSCH overlaps with a PUCCH carrying UCI in time domain, UE is expected to multiplex UCI content onto PUSCH according to a set of rules. This is known as UCI piggybacking on PUSCH. UCI piggybacking on PUSCH is supported for both CP-OFDM and DFT-S-OFDM waveforms. Piggybacked UCI are mapped after first DMRS (demodulation reference signal) of PUSCH (no frequency division multiplexing with DMRS is allowed). UCI piggybacking is the only method to carry HARQ-ACK feedback on PUSCH. Piggybacking/multiplexing UCI on PUSCH is subject to multiplexing timeline conditions defined in TS 38.213. In case of UCI piggybacking/scheduling on PUSCH, almost all UCI content is rate matched in PUSCH according to specific rules depending on the UCI type. The only exception is HARQ-ACK feedback with up to 2 bits, which is transmitted through puncturing on PUSCH.

In addition, Beta offsets and/or alpha values may be configured/indicated by a gNB or network node (e.g., configured values may be sent to the UE for Beta offsets and/or alpha values). Beta offsets may inform the UE how much resources from PUSCH should (or may) be allocated to the UCI. For different ranges of UCI payload sizes, there may be different beta offsets. A size of UCI may determine how much of PUSCH the UCI can occupy or consume. Beta offsets for PUSCH may be used to decouple BLER (block error rate) of UCI from data. It may be accomplished through weighting of the number of resources consumed by HARQ-ACK, CSI-part 1 or CSI-part 2 (either or both can be viewed as UCI). For example, Beta-offsets may be configured separately for HARQ-ACK feedback for different sizes, such as for: up to 2 bits (2 bits UCI, with a first beta offset), >2 bits and up to 11 bits, more than 11 bits, CSI part 1 up to 11 bits, CSI part 1 more than 11 bits, CSI part 2 up to 11 bits, and/or for CSI part 2 of more than 11 bits. Those offsets can be configured/indicated either semi statically through RRC (radio resource control messages) or via dynamic selection of configurations using DCI. Beta offsets may be configured separately for CSI and HARQ-ACK.

Alpha (a) values may be configured by higher layer parameter 'scaling', which is introduced to make sure that UCI does not consume all PUSCH resources (e.g., to ensure that at least some portion of the PUSCH is available for transmission of data). Alpha or an alpha value may indicate a maximum amount of resources the UCI can consume or use, within a PUSCH. Alpha may be indicated for the UCI.

Also, as used herein, the term beam or (UL) beam may also refer to spatial relation information, (separate) UL TCI state, joint or common TCI state, spatial filter, power control information (or power control parameters set), SRS (sounding reference signal) resource indicator (pointing to one or more SRS resources) panel or panel ID (e.g., antenna panel identifier), a quasi-colocation (QCL) information Type-D (or any other type), etc.

Note that a UE panel (UE antenna panel) may be identified by an index of corresponding UE capability value set or by a panel ID (panel identifier). Alternatively, or additionally, a panel (or antenna panel) may be identified or associated by at least one reference signal (such as at least one downlink reference signal, such as SSB (synchronization signal block (SSB) reference signal, and/or channel state information-reference signal (CSI-RS)), or simply by an UL beam.

Release 18 may allow simultaneous PUSCH transmissions (e.g., transmission of two time-domain overlapping PUSCH transmissions), which may be transmitted to same or different transmission-reception points (TRPs), e.g., to same or different gNBs and in the same (serving) cell. However, as noted, if the PUCCH and PUSCH(s) overlap in time, the UE may transmit the UCI on or within the PUSCH(s) (e.g., by piggy-backing the UCI on the PUSCH), which may include the UE multiplexing the UCI with UL data onto the PUSCH. Thus, in the case where a PUSCH(s) overlaps in time with a PUCCH carrying the UCI, the UE may (and may be expected to) multiplex UCI contents or bits onto the PUSCH(s). However, for two time-domain overlapping PUSCHs, there are presently no established rules for how the UE should map and/or transmit the UCI contents over one or both of the time-domain overlapping PUSCHs.

Figure 2:
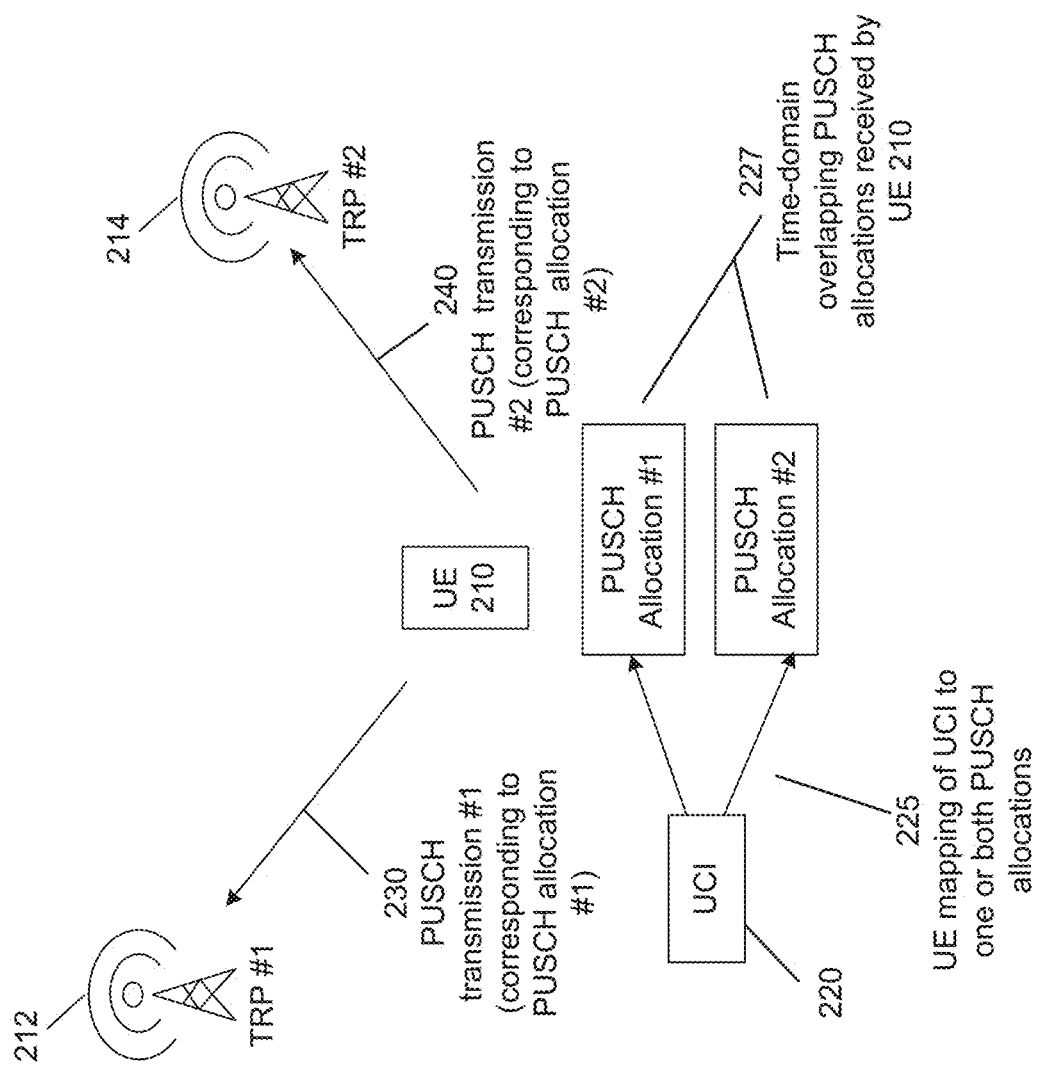
FIG. 2 is a diagram illustrating a multi-TRP communication according to an example embodiment.

FIG. 2 is a diagram illustrating a multi-TRP communication according to an example embodiment. As shown in FIG. 2, a UE 210 may be in communication with (and/or may be connected to) one or both of the transmission-reception points (TRPs) 212 and/or 214. TRPs 212 and 214 may be gNBs or other network nodes. In the example of FIG. 2, at 227, UE 210 may receive, e.g., via downlink control information (DCI) (or otherwise the UE may determine, e.g. in case of configured-grant PUSCH) two PUSCH allocations (e.g., PUSCH allocation #1, and PUSCH allocation #2) from a TRP(s) (e.g., from TRPs 212 and/or 214). Time-domain overlapping PUSCH allocations #1 and #2 may at least include time-frequency resources that may be used for PUSCH transmissions. PUSCH allocations #1 and #2 may overlap in time, and may include frequency resources that may be fully/partially/non-overlapping.

As shown in FIG. 2, UE 210 may map (225) a UCI (uplink control information) 220 (e.g., map the bits or contents of the uplink control information (UCI 220)) into one or more of the PUSCH allocations (including into PUSCH allocation #1 and/or PUSCH allocation #2). Mapping (225) of the UCI 220 to one or both (or one or more) PUSCH allocations may include, for example, assigning one or more of UCI parts or bits to one or both (or one or more) of the PUSCH allocations for transmission (e.g., for transmission via PUSCH transmission(s) corresponding to the PUSCH allocation(s)). For example, mapping of UCI may include mapping of the UCI 220 (e.g., one or more UCI bits or parts) to PUSCH allocation #1 corresponding to PUSCH transmission #1 (230), and/or mapping of the UCI 220 (e.g., one or more UCI bits or parts) to PUSCH allocation #2 corresponding to PUSCH transmission #2 (240). Thus, the PUSCH transmission #1 may include a transmission by UE 210 of data (if any) and/or UCI (e.g., multiplexed data and UCI bits) via the PUSCH allocation #1, while PUSCH transmission #2 may include a transmission by UE 210 of data (if any) and/or UCI (e.g., multiplexed data and UCI bits). For example, mapping a UCI 220 to a PUSCH allocation may include mapping the corresponding coded UCI bits and/or multiplex these coded UCI bits with the data bits (if any) into the PUSCH allocation.

Illustrative examples described herein are described with two PUSCH allocations corresponding to two PUSCH transmissions. However, the techniques described herein may be applied to at least two (including possibly more than two) PUSCH allocations and corresponding transmissions, e.g., such as three, four or more PUSCH allocations and corresponding PUSCH transmissions.

According to an example embodiment, the UE 210 may map (225, FIG. 2) the UCI 220 (or at least one UCI 220) to at least one of the following or according to at least one of the following:
  to one of the at least two PUSCH allocations;
  separately to each of the at least two PUSCH allocations; or
  across the at least two PUSCH allocations;
  wherein the mapping is (or may be) based on at least one of: one or more
  configured or pre-defined rules (e.g., known and applied by the UE), or at least one indication (e.g., control information or a message provided a signal or other indication) received by the UE 210 from a TRP or network node (e.g., gNB). As noted, a PUSCH allocation may include resources (e.g., time-frequency resources and/or spatial resources, such as beam(s)) allocated to the UE 210 for a corresponding PUSCH transmission. Examples of the mapping based on one or more configured or pre-defined rules, or at least one indication are described hereinbelow.

Mapping a UCI to one of the at least two PUSCH allocations may include a case where the UCI is mapped to one (e.g., only one, and not both) of the PUSCH allocations.

Mapping a UCI across the at least two PUSCH allocations may correspond to a case (or may include) where a single codeword is mapped across PUSCH allocations, or a single RV (redundancy version) is used/indicated for both PUSCH allocations. In this case, coded bits of the same UCI are mapped across PUSCH allocations. This may include the coded bits (e.g., all of the coded bits) of the UCI are mapped to each (or both) of the PUSCH allocations, or may include a case where a first set (or first part) of the coded bits of the UCI are mapped to PUSCH allocation #1, and a second set (or second part) of the coded bits of the UCI are mapped to PUSCH allocation #2.

Mapping a UCI into (or to or onto) each of the at least two PUSCH allocations separately may correspond to (or may include) a case where different codewords are mapped to the PUSCH allocations or for a same codeword to be mapped to both PUSCH allocations, e.g., where a different RV is used/indicated for each PUSCH allocation. In this case, parts of UCI may be encoded separately, and coded bits of one UCI part may be mapped into one PUSCH allocation and coded bits of the other UCI part may be mapped into the other PUSCH allocation; alternatively, coded bits of the same UCI may be mapped to each PUSCH allocation.

In some embodiments, 'mapping a UCI across PUSCH allocations' and 'mapping a UCI into (or to or onto) both PUSCH allocations separately' may correspond or may include to the same thing and/or may correspond to one of the above possibilities.

Figure 3:
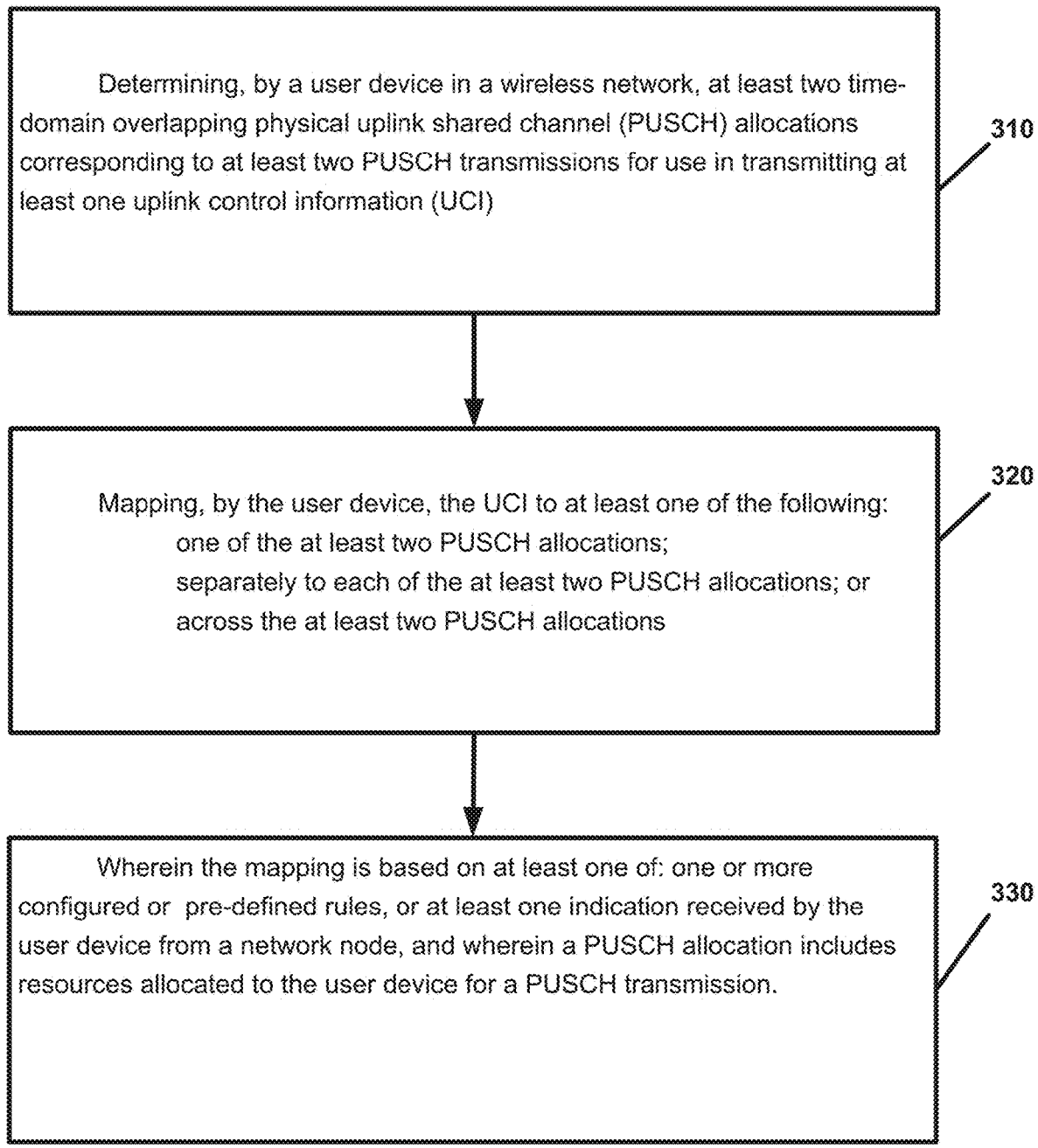
FIG. 3 is a flow chart illustrating operation of a user device or UE according to an example embodiment.

FIG. 3 is a flow chart illustrating operation of a user device or UE according to an example embodiment. Operation 310 includes determining, by a user device (e.g., UE 210) in a wireless network, at least two time-domain overlapping physical uplink shared channel (PUSCH) allocations (e.g., PUSCH allocation #1 and PUSCH allocation #2, FIG. 2) corresponding to at least two PUSCH transmissions (e.g., corresponding to PUSCH transmission #1 (230) and PUSCH transmission #2 (240), respectively, FIG. 2) for use in transmitting at least one uplink control information (UCI 220, FIG. 2). Operation 320 includes mapping, by the user device (e.g., UE 210), the UCI (e.g., UCI 220, FIG. 2) to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

In an example embodiment, the method of FIG. 3 may further include transmitting (e.g., sec PUSCH transmission #1 and/or PUSCH transmission #2, FIG. 2) the at least one uplink control information (E.g., UCI 220, FIG. 2) via one or both (or one or more) of the (at least two) PUSCH allocations, based on the mapping.

In an example embodiment, the mapping may be based on at least one of the following: 1) whether the at least one UCI is scheduled for transmission on one of the at least two PUSCHs, or 2) whether the UCI is initially carried on a physical uplink control channel (PUCCH) that can be multiplexed into one of the at least two PUSCHs.

In an example embodiment, if the UCI is scheduled for transmission on one or more of the at least two PUSCHs, the mapping may include mapping, by the user device or UE, the at least one UCI into each of the at least two PUSCH allocations separately or across the at least two PUSCH allocations; and if the at least one UCI is initially carried on the PUCCH which can be multiplexed into one of the PUSCHs, the mapping may include mapping, by the user device or UE 210, the at least one UCI into one of the at least two PUSCH allocations.

In an example embodiment, the mapping of the at least one UCI into one of the at least two PUSCH allocations may include: mapping, by the user device or UE 210, the UCI into one of the at least two PUSCH allocations corresponding to at least one of a same capability value set, a same antenna panel, a same transmission-reception point (TRP), a same control resource set pool index (CORESETpoolindex), a same CORESET group, a same set of transmission configuration indication (TCI) states, a same set of reference signals, or same corresponding PCI (physical cell ID) as the PUCCH.

In an example embodiment, the mapping of the at least one UCI may be based on whether a same data block or codeword is mapped into each of the at least two PUSCH allocations, or whether different data blocks or codewords are mapped to the at least two PUSCH allocations.

In an example embodiment, if a same codeword or data block is mapped across the at least two PUSCH allocations, the mapping may include mapping, by the user device or UE, the at least one UCI into the at least two PUSCH allocations separately or across both PUSCH allocations; and if different codewords or data blocks are mapped across the at least two PUSCH allocations, the mapping may include mapping, by the user device, the UCI into one of the at least two PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals, or a same corresponding PCI (physical cell ID) as the PUCCH.

In an example embodiment, the mapping of the at least one UCI may be based on whether, for a same codeword, a same redundancy version (RV) of a data block is used or indicated for the at least two PUSCH allocations, or whether different redundancy versions (RVs) of the data block are used or indicated for the at least two PUSCH allocations.

In an example embodiment, if the same redundancy version (RV) of the data block is used separately for each of the at least two PUSCH allocations or across the at least two PUSCH allocations, the mapping may include mapping, by the user device, the UCI across the at least two PUSCH allocations; and if different redundancy versions (RVs) of the data block are used for the at least two PUSCH allocations, the mapping comprises mapping, by the user device, the at least one UCI into each of the at least two PUSCH allocations separately, or mapping the UCI into one of the at least two PUSCH allocations.

In an example embodiment, the mapping may be based on a beta offset value received by the user device or UE within downlink control information.

In an example embodiment, a first subset of beta values are associated with mapping the at least one UCI separately into each of the at least two PUSCH allocations or across the at least two PUSCH allocations; and a second subset of beta values is associated with mapping the at least one UCI into one of the at least two PUSCHs.

In an example embodiment, the mapping may be based on a number of layers corresponding to each PUSCH allocation.

In an example embodiment, the mapping may include at least one of the following: mapping, by the user device or UE, the at least one UCI into one of the at least two PUSCH allocations that has a higher or lower starting data block or frequency; or mapping, by the user device or UE, the at least one UCI into one of the at least two PUSCH allocations corresponding to a specific transmission-reception point (TRP) or a specific transmission configuration indication (TCI) state or a specific PCI (physical cell ID).

In an example embodiment, the method may include determining, by the user device or UE, a first association between beta offsets and/or alpha values to PUSCH allocations; and determining, by the user device or UE, a second association between beta offsets and/or alpha values to different capability value sets or antenna panels, transmission-reception points (TRPs), CORESETpool indexes or CORESET groups, sets of TCI states, sets of reference signals, or PCI(s); and wherein the mapping may include mapping, by the user device, of the at least one UCI based on the first association and the second association.

In an example embodiment, the mapping may include: mapping, by the user device or UE, of the at least one UCI into a PUSCH allocation that has a transmission configuration indication (TCI) state that matches a TCI state of a physical uplink control channel (PUCCH) associated with the at least one UCI.

Figure 4:
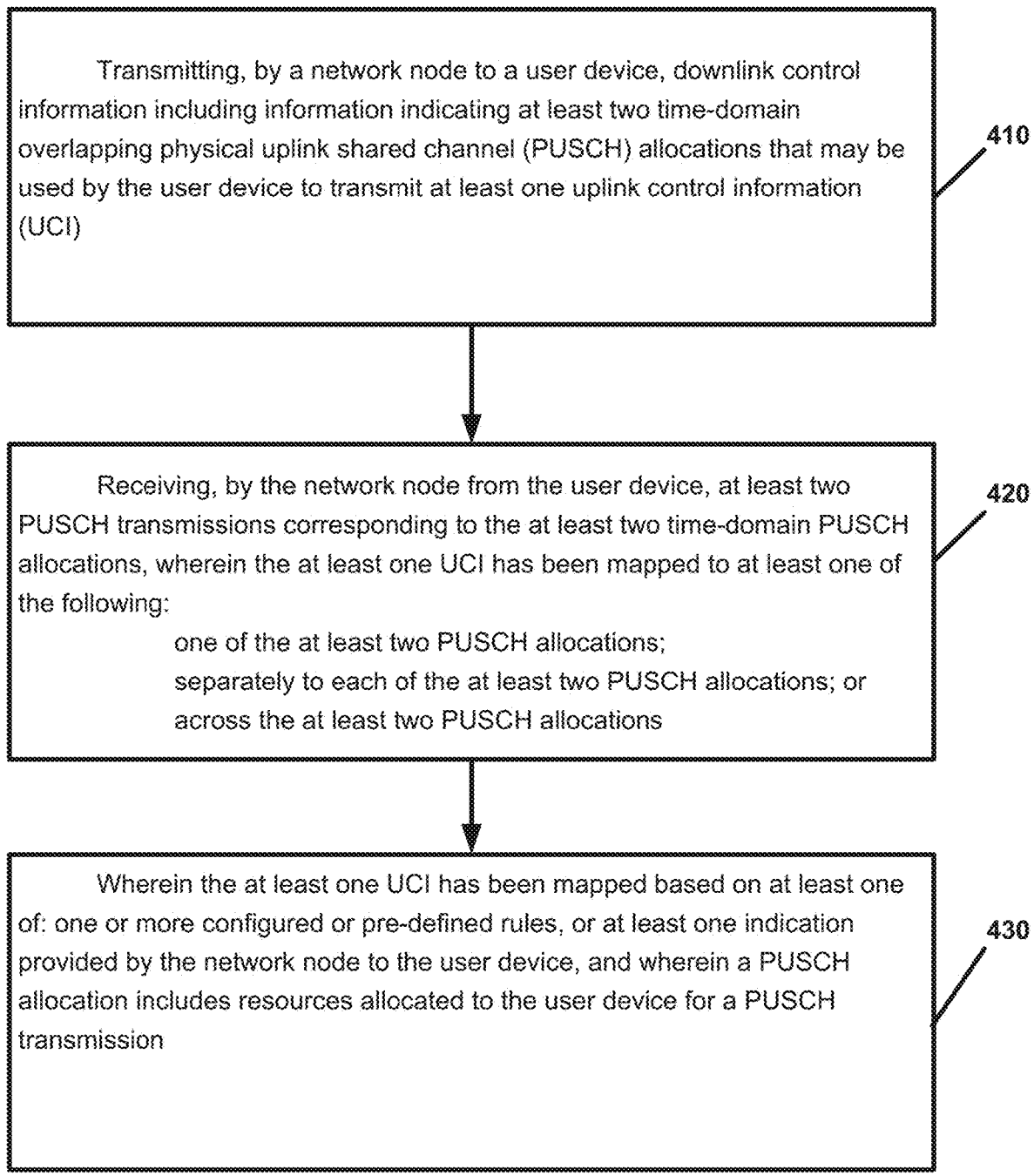
FIG. 4 is a flow chart illustrating operation of a network node (e.g., a transmission-reception point (TRP), a gNB or other network node) according to an example embodiment.

FIG. 4 is a flow chart illustrating operation of a network node (e.g., a transmission-reception point (TRP) or gNB or other network node) according to an example embodiment. Operation 410 includes transmitting, by a network node to a user device, downlink control information including information indicating at least two time-domain overlapping physical uplink shared channel (PUSCH) allocations that may/can be used by the user device to transmit at least one uplink control information (UCI). Operation 420 includes receiving, by the network node from the user device, at least two PUSCH transmissions corresponding to the at least two time-domain PUSCH allocations, wherein the at least one UCI has been mapped to at least one of the following or according to the following: one of the at least two PUSCH allocations; separately to each of the at least two PUSCH allocations; or across the at least two PUSCH allocations. Operation 430 indicates that the at least one UCI has been mapped based on at least one of: one or more configured or pre-defined rules, or at least one indication provided by the network node to the user device, and wherein a PUSCH allocation includes resources allocated to the user device for a PUSCH transmission.

In an example embodiment, the at least one UCI has been mapped based on at least one of the following: 1) whether the at least one UCI is scheduled for transmission on one of the at least two PUSCHs, or 2) whether the UCI is initially carried on a physical uplink control channel (PUCCH) that can be multiplexed into one of the at least two PUSCHs.

In an example embodiment, the at least one UCI has been mapped into one of the at least two PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

In an example embodiment, the at least one UCI is mapped based on whether a same data block or codeword is mapped into the at least two PUSCH allocations, or whether different data blocks or codewords are mapped to the at least two PUSCH allocations.

In an example embodiment, if a same codeword or data block is mapped across the at least two PUSCH allocations, the at least one UCI is mapped into the at least two PUSCH allocations separately or across the at least two PUSCH allocations; and if different codewords or data blocks are mapped across the at least two PUSCH allocations, the at least one UCI is mapped into one of the at least two PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, a same set of reference signals, or a same PCI as the PUCCH.

In an example embodiment, the at least one UCI is mapped based on whether, for a same codeword, a same redundancy version (RV) of a data block is used or indicated for the at least two PUSCH allocations, or whether different redundancy versions (RVs) of the data block are used or indicated for the at least two PUSCH allocations.

In an example embodiment, if the same redundancy version (RV) of the data block is used separately for each of the at least two PUSCH allocations or across the at least two PUSCH allocations, the at least one UCI is mapped across the at least two PUSCH allocations; and if different redundancy versions (RVs) of the data block are used for the at least two PUSCH allocations, the at least one UCI is mapped into each of the at least two PUSCH allocations separately, or mapping the UCI into one of the at least two allocations.

In an example embodiment, the at least one UCI is mapped based on a beta offset value received by the user device within downlink control information.

In an example embodiment, a first subset of beta values are associated with mapping the at least one UCI separately into each of the at least two PUSCH allocations or across the at least two PUSCH allocations; and a second subset of beta values is associated with mapping the at least one UCI into one of the at least two PUSCHs.

In an example embodiment, the at least one UCI is mapped based on a number of layers corresponding to each PUSCH allocation.

In an example embodiment, the at least one UCI is mapped based on at least one of the following: the at least one UCI is mapped into one of the at least two PUSCH allocations that has a higher or lower starting data block or frequency; or the at least one UCI is mapped into one of the at least two PUSCH allocations corresponding to a specific transmission-reception point (TRP) or a specific transmission configuration indication (TCI) state.

In an example embodiment, the at least one UCI is mapped into a PUSCH allocation that has a transmission configuration indication (TCI) state that matches a TCI state of a physical uplink control channel (PUCCH) associated with the at least one UCI.

For at least two time-domain overlapping PUSCH allocations (or occasions), DCI dynamically scheduling of the PUSCH allocations may be used, or the PUSCH allocations may be configured grants (and not dynamic scheduled) corresponding to at least two PUSCH transmissions used for transmitting at least one UCI.

In an example embodiment, the UCI may be mapped to: one of the at least two PUSCH allocations, or separately to both (or each of the at least two) PUSCH allocations (e.g., UCI will be coded, and then the coded UCI code bits may be transmitted via one or both of the PUSCH allocations, e.g., based on rate matching, mapping of UCI may be based on mapping coded UCI bits). For example, separately to both of the (or separately to each of the at least two) PUSCH allocations may mean or may include that some of the UCI bits are sent/transmitted via PUSCH allocation #1 and transmitted via PUSCH transmission #1, and some other (e.g., different) UCI bits may be sent via PUSCH allocation #2 and transmitted via PUSCH transmission #2.

Also, for example, the PUSCH transmission may consider cases of PUSCH carrying a TB (transport block or block of data to be transmitted) (or more than one TB) or not carrying a TB (i.e., PUSCH carry UCI without UL-SCH data). Also, the at least two time-overlapping PUSCH allocations corresponding to at least two PUSCH transmissions may use/apply two (UL or joint) TCI states.

In an example embodiment, the mapping for a UCI (from the at least one UCI) may depend on whether the UCI is scheduled on PUSCH (such as A-CSI (aperiodic CSI) or SP (semi-persistent)-CSI, and both of these can be scheduled directly onto PUSCH, to transmit channel state information via PUSCH) (semi persistent could also be on PUCCH, and may be triggered separately) or whether the UCI is initially carried on PUCCH which can be multiplexed into PUSCH, where: if the UCI is scheduled on PUSCH (PUSCH is directly scheduled to carry UCI/CSI), the UE may map the UCI (which may be or may include CSI) into both PUSCH allocations separately or across both PUSCH allocations; if the UCI is initially carried on PUCCH which can be multiplexed into PUSCH, the UE may map the UCI into one PUSCH allocation; the one PUSCH allocation may be the PUSCH allocation corresponding to the same capability value set (or panel) or same TRP or same CORESETpoolindex or same CORESET group or same set of TCI states or same set of RSs (such as SSB, CSI-RS, SRS) or same PCI as the PUCCH. In either of these cases (UCI comes from one of these possibilities), the UE will need to determine whether to map UCI onto one PUSCH or both PUSCHs.

In an example embodiment, the mapping for a UCI (from the at least one UCI) may depend on whether a same TB (or codeword) is mapped to both (or the at least two) PUSCH allocations or different TBs (or codewords) are mapped to at least two PUSCH allocations, where: if a same codeword is mapped across both PUSCH allocations, the UE may map the UCI across both PUSCH allocations or into both PUSCH allocations separately; or, if different codewords are mapped to at least two PUSCH allocations, the UE may map the UCI into one PUSCH allocation, such as the PUSCH allocation corresponding to the same capability value set (or panel) or same TRP or same CORESETpoolindex or same CORESET group or same set of TCI states or same set of RSs (such as SSB, CSI-RS, SRS (sounding reference signals)) or capability value set or same PCI as the (overlapping) PUCCH, if any.

In an example embodiment, the mapping for a UCI (from the at least one UCI) may depend on whether, for a same codeword, a same redundancy version (RV) is used/indicated for both PUSCH allocations or different RVs are used/indicated for each of the at least two PUSCH allocations, where: if same redundancy version (RV) is used for both or across PUSCH allocations, the UE may map the UCI across the at least two PUSCH allocations; or, if different RVs are used for at least two PUSCH allocations, the UE may map the UCI into each PUSCH allocation separately. Alternatively, the UE may map the UCI into one PUSCH allocation.

In an example embodiment, the mapping for a UCI may depend on a (new or existing) indication carried in DCI such as DCI scheduling the PUSCH allocations or indication via RRC signaling, such as beta offset. As an example, a subset of beta offset values may be associated to mapping the UCI into both PUSCH allocations or across both PUSCH allocations, and another subset of beta offset values may be associated to mapping the UCI into one PUSCH allocation. Hence, when indicated the beta_offset for the UCI, the UE may know whether to map the UCI into both PUSCH allocations or across both PUSCH allocations or whether to map the UCI into one PUSCH allocation.

In an example embodiment, the mapping for a UCI may depend on the number of layers corresponding to each PUSCH allocation/transmission, where: if the number of layers is the same for the at least two PUSCH allocations/transmissions, the UE may map the UCI into both PUSCH allocations separately or across both (or the at least two) PUSCH allocations; or, if the number of layers corresponding to one of at least two PUSCH allocation/transmissions is greater than or equal to a certain threshold, the UE may map the UCI into this PUSCH allocation. For example, if the number of layers corresponding to one of at least two PUSCH allocation/transmissions is below a certain threshold, the UE may not map the UCI into this PUSCH allocation.

In an example embodiment, mapping a UCI to a PUSCH allocation/transmission may include mapping the corresponding coded UCI bits and/or multiplexing these coded UCI bits with the data bits (if any) into the PUSCH allocation/transmission.

In an example embodiment, mapping a UCI into at least two PUSCH allocations may include mapping the coded UCI bits first into one PUSCH allocation (e.g. in a frequency-first time-second manner, if PUSCH allocations in FDM, start with lower frequencies for PUSCH allocations) and then, if needed, continue the mapping into the other PUSCH allocation (e.g., in a frequency-first time-second manner). On which PUSCH allocation to start the mapping into: for the case where UCI is mapped into both PUSCH allocations and which one of them to start with; the UE may start the mapping into the PUSCH allocation that has a higher/lower (start at top or start at bottom of frequency range) starting RB in the frequency domain allocation e.g. in case of FDM-like PUSCH operation, or the PUSCH allocation corresponding to a given TRP or TCI state such as the first indicated/applicable TCI state for SDM/FDM PUSCH operation. Alternatively, which PUSCH allocation to start the mapping with may be indicated to the UE via DCI, MAC CE (media access control (MAC)-control element), and/or RRC (radio resource control). In one variant, the UE may evenly or almost evenly map the UCI into the at least two PUSCH allocations (this might be needed e.g., in case of SDM PUSCH operation/scheme).

In an example embodiment, the difference (if any) between mapping the UCI into both PUSCH allocations separately or across both PUSCH allocations may be as follows, as an illustrative example: mapping a UCI across PUSCH allocations may correspond to the case where a single codeword is mapped across PUSCH allocations or single RV is used/indicated for both (or the at least two) PUSCH allocations. In this case, coded bits of the same UCI are mapped across the at least two PUSCH allocations; and, mapping a UCI into both PUSCH allocations separately may correspond to the case where different codewords are mapped to the PUSCH allocations or for a same codeword mapped to both PUSCH allocations different RV is used/indicated for each PUSCH allocation. In this case, parts of UCI may be encoded separately, and coded bits of one UCI part may be mapped into one PUSCH allocation and the coded bits of the other UCI part may be mapped into the other PUSCH allocation; alternatively, coded bits of the same UCI are mapped to each PUSCH allocation.

If the UE is scheduled or indicated coherent joint transmission operation, where e.g., same layers(s) of same codeword would be transmitted using two PUSCH occasions or allocations through two panels (with some degree of coherency), the UE may map the UCI across both PUSCH allocations.

If the UE is scheduled or indicated SFN-like transmission operation, where e.g., same layers(s) of same codeword would be repeated using each PUSCH occasions or allocations through two panels, the UE may map the UCI to both PUSCH allocations wherein the UCI is repeated/mapped in exact same manner in each PUSCH allocation.

In some other embodiments, 'mapping a UCI across PUSCH allocations' and 'mapping a UCI into both PUSCH allocations separately' may correspond/refer to the same thing and may correspond to one of the above examples or explanations.

Note, for example, that, for mapping a UCI into at least two PUSCH allocations, the amount of resources (such as the number of REs (resource elements) the coded UCI bits may occupy in the first and the second PUSCH allocations may be either defined using a single beta offset or at least two beta offset values (where a beta offset may be per UCI type/part). In addition, there may be a single alpha (i.e., scaling parameter) value putting an upper limit on the amount of resources the UCI can occupy in (i.e. consume from) the at least two PUSCH allocations. Alternatively, there may be at least two alpha values putting an upper limit on the amount of resources the UCI can occupy (or consume) in the first and second PUSCH allocations, respectively.

In an example embodiment, there may be an association of a beta offset value(s) and/or alpha value(s) to different capability value sets (or panels) or TRPs or CORESETpool indexes or CORESET groups or sets of TCI states or sets of RSs (such as SSB, CSI-RS, SRS), and the UE may determine based on this association which beta offset value or alpha value corresponds to which PUSCH allocation. (Example: there will be an association between each of those TCI states and each PUSCH; thus, there may be an association between a beta offset and a TCI state; and based on those two associations, the UE can determine which PUSCHs to use based on the configured beta offset).

In an example embodiment, in a case of joint HARQ-ACK feedback (for multiple DCI mode) initially carried on PUCCH which can be multiplexed into PUSCH: The HARQ-ACK feedback/bits corresponding to a first TRP or CORESETPool index or CORESET group or PCI etc. may be mapped to the corresponding PUSCH allocation and the HARQ-ACK feedback/bits corresponding to a second TRP or CORESETPool index or CORESET group or PCI etc. may be mapped to their corresponding PUSCH allocation.

In an example embodiment, in case of two HARQ-ACK sub-codebooks: Existing (total) DAI (downlink assignment indicator) field in (UL) DCI may be reused or reinterpreted in such a way to indicate whether the corresponding sub-codebook should be mapped to both PUSCH allocations, and if so to which PUSCH allocation, or to one PUSCH allocation, and if so to which one; or, alternatively, a new indication in DCI (or MAC CE or even RRC) can be used, jointly with the DAI fields or separately, to indicate which sub-codebook can be mapped to which PUSCH allocation(s) (or even if there should be no mapping of a sub-codebook to a PUSCH allocation).

In an example embodiment, for UCI mapping into two PUSCH allocations, the number of coded modulation symbols per layer for UCI may be determined jointly based on both PUSCH allocations (e.g., in case of joint beta offset (and/or alpha factor) for both PUSCH allocations), where the number of resource elements that can be used for transmission of UCI in a OFDM symbol(s) may correspond to both PUSCH allocations. Alternatively, the number of coded modulation symbols per layer for UCI may be determined separately for each PUSCH allocation (e.g., in case of separate beta offsets (and/or alpha factors) for the PUSCH allocations), where the number of resource elements that can be used for transmission of UCI in a OFDM symbol(s) in a PUSCH allocation may correspond to only this PUSCH allocation.

In an example embodiment, UCI mapping into a PUSCH allocation may be based on rate matching the coded UCI bits in this PUSCH or puncturing the coded UCI bits in this PUSCH.

In an example embodiment, UCI mapping into a PUSCH allocation or two PUSCH allocations may be done per layer.

In an example embodiment, the at least one UCI may be UCI scheduled on PUSCH (such as A-CSI or SP-CSI scheduled/activated on PUSCH) and/or UCI initially carried on PUCCH (such as HARQ-ACK and/or CSI) which can be multiplexed into PUSCH.

In an example embodiment, in case of Frequency Hopping, any of the proposed mapping operation above may be applied on a per PUSCH hop basis as the UCI may be mapped to both PUSCH hops for a PUSCH allocation.

Note that although the description has been on UCI mapping considering single-DCI (or even multi-DCI) simultaneous PUSCH transmission operation, similar aspects could also be applied to UCI multiplexing/mapping considering single-DCI (or even multi-DCI) simultaneous PUCCH transmission operation, where the UCI is initially carried on PUCCH which can be multiplexed into another PUCCH. At least some of the above aspects may be adapted to the PUCCH case by essentially replacing PUSCH by PUCCH and replacing TB (transport block) by 'first UCI'.

Figure 5:
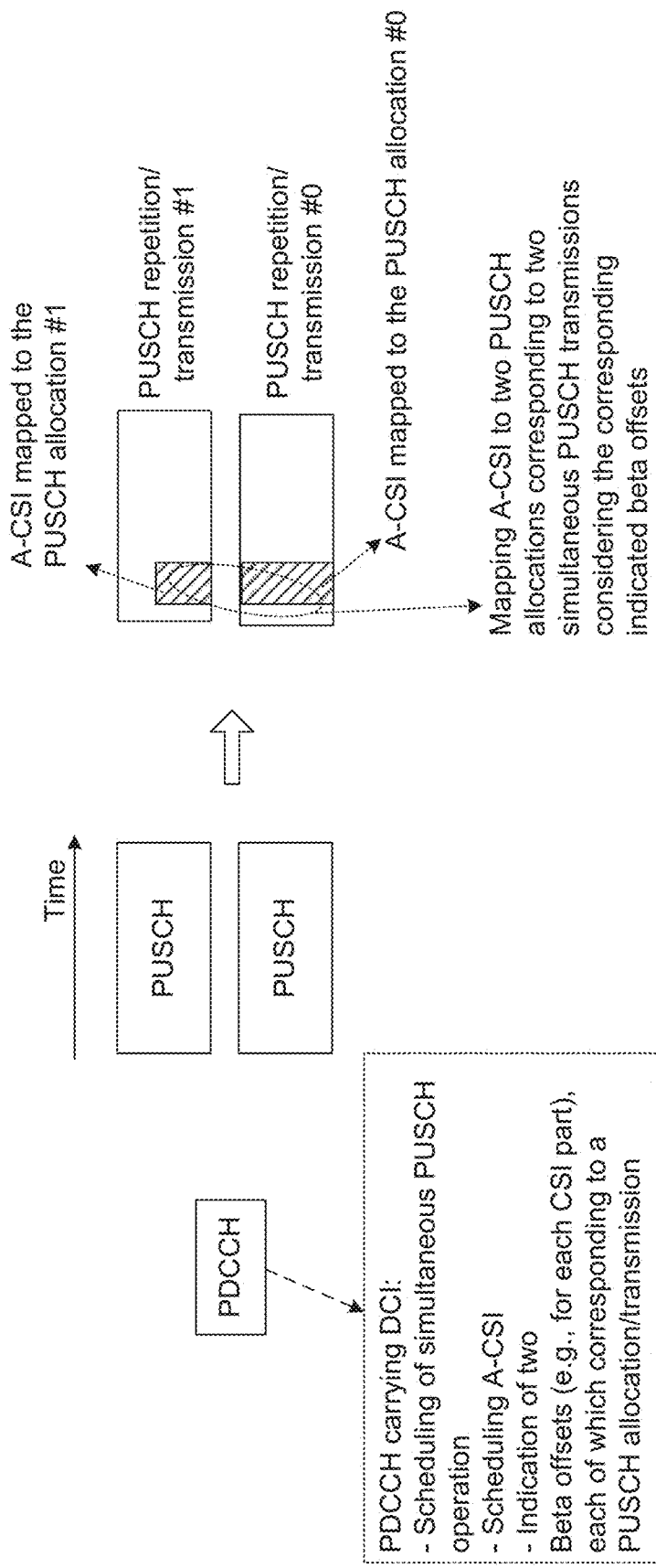
FIG. 5 is a diagram illustrating a mapping of UCI (e.g., CSI) to two PUSCH allocations corresponding to two simultaneous PUSCH transmissions based on indicated beta offsets.

FIG. 5 is a diagram illustrating a mapping of UCI (e.g., CSI) to two PUSCH allocations corresponding to two simultaneous PUSCH transmissions based on indicated beta offsets. The PDCCH may carry or include DCI. Simultaneous PUSCH transmission is scheduled (and indicated to UE via DCI or scheduling information), and control information may be sent to UE indicating beta offsets, e.g., for each CSI part, each of which may correspond to a PUSCH allocation or PUSCH transmission. For example, A-CSI may be mapped to PUSCH allocation #0, and an A-CSI may be mapped to PUSCH allocation #1, as shown in FIG. 5.

Figure 6:
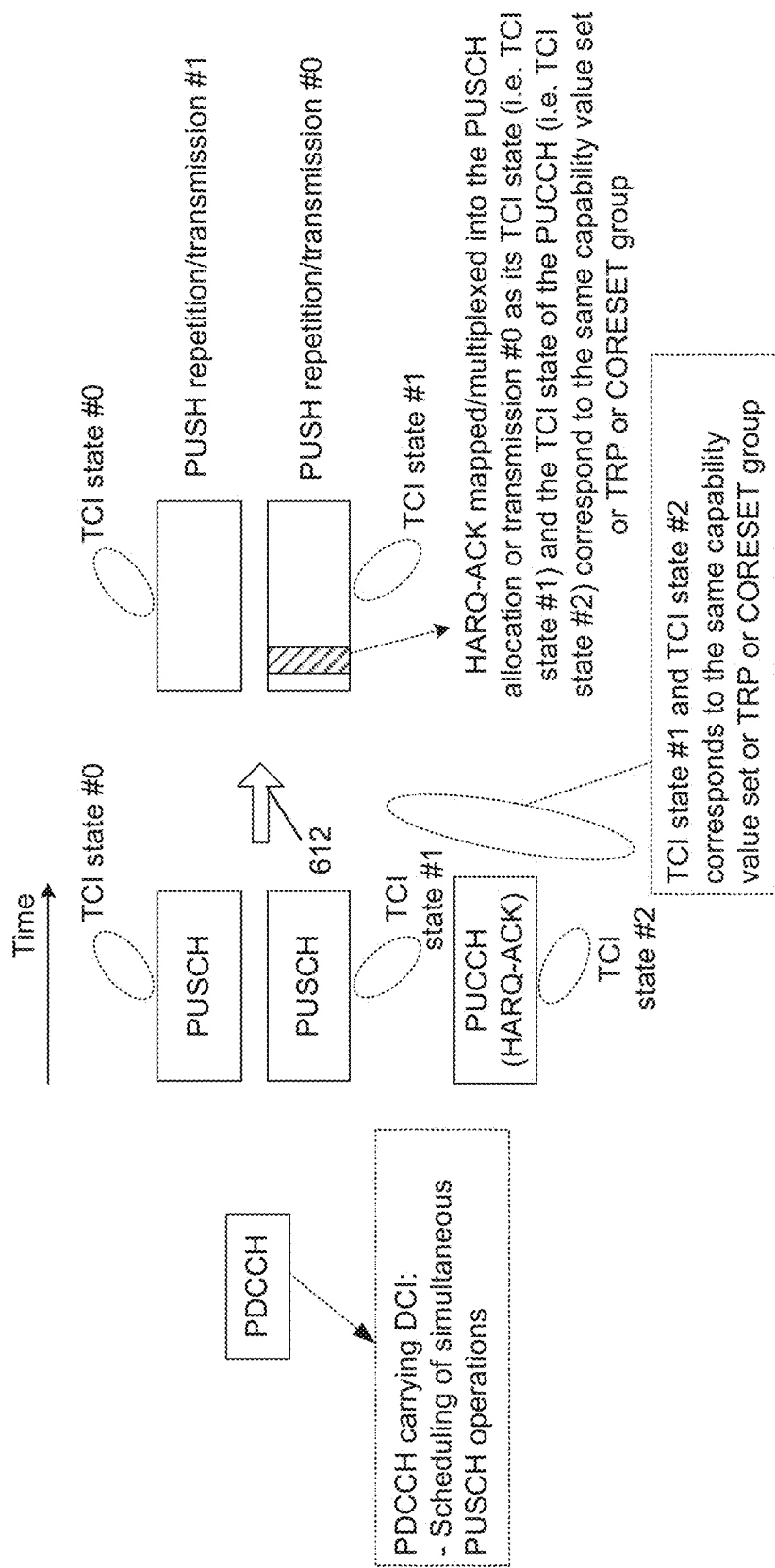
FIG. 6 is a diagram illustrating mapping of UCI into PUSCH according to another example embodiment based on scheduling of simultaneous PUSCH operation.

FIG. 6 is a diagram illustrating mapping of UCI into PUSCH according to another example embodiment based on scheduling of simultaneous PUSCH operation. FIG. 6 illustrates an example where the UCI is mapped into a PUSCH allocation that has a transmission configuration indication (TCI) state that matches a TCI state of a physical uplink control channel (PUCCH) associated with the at least one UCI. In this example, TCI state #1 and TCI state #2 correspond to the same capability value set or TRP or CORESET group (or CORESETPoolIndex) or same UE antenna panel or same PCI or same TCI state group/pool or same reference signal group. The arrow indicates multiplexing, e.g., HARQ ACK is multiplexed into PUSCH. As shown, PUCCH has a TCI state #2, which corresponds to the same e.g., TRP or CORESETPoolIndex as TCI state #1. Thus, in this example, the UE maps the UCI (e.g., HARQ-ACK) of the PUCCH to the PUSCH transmission #0, which has a TCI state #1.

Some further examples will be described:

Example 1. A method including: determining, by a user device in a wireless network, at least two physical uplink shared channel (PUSCH) allocations overlapping in time domain and corresponding to at least two PUSCH transmissions for use in transmitting at least one uplink control information (UCI); and mapping, by the user device, the at least one UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

Example 2. The method of example 1, further comprising: transmitting the at least one UCI via one or more of the at least two PUSCH allocations, based on the mapping.

Example 3. The method of any of examples 1-2, wherein the mapping the at least one UCI based on at least one of: one or more configured or pre-defined rules, or at least one indication comprises mapping based on at least one of the following: 1) whether the at least one UCI is scheduled for transmission on one of the at least two PUSCHs, or 2) whether the at least one UCI is initially carried on a physical uplink control channel (PUCCH) that can be multiplexed into one of the at least two PUSCHs.

Example 4. The method of example 3, wherein: if the UCI is scheduled for transmission on one or both of the at least two PUSCHs, the mapping comprises mapping, by the user device, the at least one UCI to each of the two PUSCH allocations separately or across the at least two PUSCH allocations; and if the at least one UCI is initially carried on the PUCCH which can be multiplexed into one of the at least two PUSCHs, the mapping comprises mapping, by the user device, the at least one UCI to one of the at least two PUSCH allocations.

Example 5. The method of example 4, wherein the mapping the at least one UCI based on at least one of: one or more configured or pre-defined rules, or at least one indication comprises: mapping, by the user device, the UCI to one of the at least two PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, a same set of reference signals, or a same Physical cell ID (PCI) as the PUCCH.

Example 6. The method of any of examples 1-5, wherein the mapping the at least one UCI based on at least one of: one or more configured or pre-defined rules, or at least one indication of the at least one UCI comprises mapping based on whether a same data block or codeword is mapped to the at least two PUSCH allocations, or whether different data blocks or codewords are mapped to the at least two PUSCH allocations.

Example 7. The method of example 6, wherein: if a same codeword or data block is mapped across the at least two PUSCH allocations, the mapping the at least one UCI based on at least one of: one or more configured or pre-defined rules, or at least one indication comprises mapping, by the user device, the at least one UCI to the two PUSCH allocations separately or across the at least two PUSCH allocations; and if different codewords or data blocks are mapped across the at least two PUSCH allocations, the mapping the at least one UCI based on at least one of: one or more configured or pre-defined rules, or at least one indication comprises mapping, by the user device, the UCI into one of the at least two PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, a same set of reference signals, or a same PCI as the PUCCH.

Example 8. The method of any of examples 1-7, wherein the mapping the at least one UCI based on at least one of: one or more configured or pre-defined rules, or at least one indication comprises mapping the at least one UCI based on whether, for a same codeword, a same redundancy version (RV) of a data block is used or indicated for both of the at least two PUSCH allocations, or whether different redundancy versions (RVs) of the data block are used or indicated for the at least two PUSCH allocations.

Example 9. The method of example 8, wherein: if the same redundancy version (RV) of the data block is used separately for both of the at least two PUSCH allocations or across both of the at least two PUSCH allocations, the mapping the at least one UCI based on at least one of: one or more configured or pre-defined rules, or at least one indication comprises mapping, by the user device, the UCI across both of the at least two PUSCH allocations; and if different redundancy versions (RVs) of the data block are used for the at least two PUSCH allocations, the mapping the at least one UCI based on at least one of: one or more configured or pre-defined rules, or at least one indication comprises mapping, by the user device, the at least one UCI to each of the at least two PUSCH allocations separately, or mapping the UCI to one of the at least two PUSCH allocations.

Example 10. The method of any of claims 1-9, wherein the mapping the at least one UCI based on at least one of: one or more configured or pre-defined rules, or at least one indication comprises mapping based on a beta offset value received by the user device within downlink control information.

Example 11. The method of example 10, wherein: a first subset of beta values are associated with mapping the at least one UCI separately into both of the at least two PUSCH allocations or across both of the at least two PUSCH allocations; and a second subset of beta values is associated with mapping the at least one UCI into one of the at least two PUSCHs.

Example 12. The method of any of examples 1-11, wherein the mapping is based on a number of layers corresponding to each of the at least two PUSCH allocation.

Example 13. The method of any of examples 1-12, wherein the mapping the at least one UCI based on at least one of: one or more configured or pre-defined rules, or at least one indication comprises at least one of the following: mapping, by the user device, the at least one UCI to one of the at least two PUSCH allocations that has a higher or lower starting data block or frequency; or mapping, by the user device, the at least one UCI to one of the at least two PUSCH allocations corresponding to a specific transmission-reception point (TRP) or a specific transmission configuration indication (TCI) state.

Example 14. The method of any of examples 1-13, comprising: determining, by the user device, a first association between beta offsets and/or alpha values to the at least two PUSCH allocations; and/or determining, by the user device, a second association between beta offsets and/or alpha values to different capability value sets or antenna panels, transmission-reception points (TRPs), CORESET-pool indexes or CORESET groups, sets of TCI states, or sets of reference signals; and wherein the mapping the at least one UCI based on at least one of: one or more configured or pre-defined rules, or at least one indication comprises mapping, by the user device, of the at least one UCI based on the first association and/or the second association.

Example 15. The method of any of examples 1-14, wherein the at least one UCI mapping based on at least one of: one or more configured or pre-defined rules, or at least one indication comprises: mapping, by the user device, of the at least one UCI to a PUSCH allocation that has a transmission configuration indication (TCI) state that matches a TCI state of a physical uplink control channel (PUCCH) associated with the at least one UCI.

Example 16. An apparatus comprising: at least one processor; and at least one memory including computer program code; the at least one memory and the computer program code configured to, with the at least one processor, cause the apparatus at least to: determine, by a user device in a wireless network, at least two time-domain overlapping physical uplink shared channel (PUSCH) allocations corresponding to at least two PUSCH transmissions for use in transmitting at least one uplink control information (UCI); and map, by the user device, the UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

Example 17. The apparatus of example 16, wherein the at least one processor and the computer program code are further configured to cause the apparatus to: transmit the at least one uplink control information via one or more of the at least two PUSCH allocations, based on the mapping.

Example 18. The apparatus of any of examples 16-17, wherein the at least one processor and the computer program code configured to cause the apparatus to map based on at least one of: one or more configured or pre-defined rules, or at least one indication comprises mapping based on at least one of the following: 1) whether the at least one UCI is scheduled for transmission on one of the at least two PUSCHs, or 2) whether the UCI is initially carried on a physical uplink control channel (PUCCH) that can be multiplexed into one of the at least two PUSCHs.

Example 19. The apparatus of example 18, wherein the at least one processor and the computer program code are configured to cause the apparatus to perform the following: if the UCI is scheduled for transmission on one or both PUSCHs, the mapping comprises mapping, by the user device, the at least one UCI into both PUSCH allocations separately or across both PUSCH allocations; and if the at least one UCI is initially carried on the PUCCH which can be multiplexed into one of the PUSCHs, the mapping comprises mapping, by the user device, the at least one UCI into one of the PUSCH allocations.

Example 20. The apparatus of example 19, wherein the at least one processor and the computer program code configured to cause the apparatus to map based on at least one of: one or more configured or pre-defined rules, or at least one indication comprises the at least one processor and the computer program code configured to cause the apparatus to: map, by the user device, the UCI into one of the PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

Example 21. The apparatus of any of examples 16-20 wherein the at least one processor and the computer program code configured to cause the apparatus to map based on at least one of: one or more configured or pre-defined rules, or at least one indication the at least one UCI into one of the PUSCH allocations comprises the at least one processor and the computer program code configured to cause the apparatus to: map the at least one UCI based on whether a same data block or codeword is mapped into both PUSCH allocations, or whether different data blocks or codewords are mapped to the at least two PUSCH allocations.

Example 22. The apparatus of example 21, wherein at least one processor and the computer program code are configured to cause the apparatus to perform the following: if a same codeword or data block is mapped across both PUSCH allocations, the mapping comprises mapping, by the user device, the at least one UCI into both PUSCH allocations separately or across both PUSCH allocations; and if different codewords or data blocks are mapped across the at least two PUSCH allocations, the mapping comprises mapping, by the user device, the UCI into one of the PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

Example 23. The apparatus of any of examples 16-22 wherein the at least one processor and the computer program code configured to cause the apparatus to map the at least one UCI based on at least one of: one or more configured or pre-defined rules, or at least one indication comprises the at least one processor and the computer program code configured to cause the apparatus to map the at least one UCI is based on whether, for a same codeword, a same redundancy version (RV) of a data block is used or indicated for both PUSCH allocations, or whether different redundancy versions (RVs) of the data block are used or indicated for the at least two PUSCH allocations.

Example 24. The apparatus of examples 23, wherein the at least one processor and the computer program code are configured to cause the apparatus to perform the following: if the same redundancy version (RV) of the data block is used separately for both PUSCH allocations or across both PUSCH allocations, the mapping comprises mapping, by the user device, the UCI across both PUSCH allocations; and if different redundancy versions (RVs) of the data block are used for the at least two PUSCH allocations, the mapping comprises mapping, by the user device, the at least one UCI into each of the PUSCH allocations separately, or mapping the UCI into one of the PUSCH allocations.

Example 25. The apparatus of any of examples 16-24, wherein the at least one processor and the computer program code configured to cause the apparatus to map the at least one UCI based on at least one of: one or more configured or pre-defined rules, or at least one indication comprises the at least one processor and the computer program code configured to cause the apparatus to map based on a beta offset value received by the user device within downlink control information.

Example 26. The apparatus of example 25, wherein: a first subset of beta values are associated with mapping the at least one UCI separately into both PUSCH allocations or across both PUSCH allocations; and a second subset of beta values is associated with mapping the at least one UCI into one of the PUSCHs.

Example 27. The apparatus of any of examples 16-26, wherein the at least one processor and the computer program code configured to cause the apparatus to map the at least one UCI based on at least one of: one or more configured or pre-defined rules, or at least one indication comprises the at least one processor and the computer program code configured to map based on a number of layers corresponding to each PUSCH allocation.

Example 28. The apparatus of any of examples 16-27, wherein the at least one processor and the computer program code configured to map the at least one UCI based on at least one of: one or more configured or pre-defined rules, or at least one indication comprises the at least one processor and the computer program code configured to perform at least one of the following: map, by the user device, the at least one UCI into one of the PUSCH allocations that has a higher or lower starting data block or frequency; or map, by the user device, the at least one UCI into one of the PUSCH allocations corresponding to a specific transmission-reception point (TRP) or a specific transmission configuration indication (TCI) state.

Example 29. The apparatus of any of examples 16-28, wherein the at least one processor and the computer program code are configured to cause the apparatus to: determine, by the user device, a first association between beta offsets and/or alpha values to PUSCH allocations; and determine, by the user device, a second association between beta offsets and/or alpha values to different capability value sets or antenna panels, transmission-reception points (TRPs), CORESETpool indexes or CORESET groups, sets of TCI states, or sets of reference signals; and wherein the at least one processor and the computer program code configured to cause the apparatus to map the at least one UCI based on at least one of: one or more configured or pre-defined rules, or at least one indication comprises the at least one processor and the computer program code configured to cause the apparatus to map, by the user device, the at least one UCI based on the first association and the second association.

Example 30. The apparatus of any of examples 16-29, wherein the at least one processor and the computer program code configured to cause the apparatus to map the at least one UCI based on at least one of: one or more configured or pre-defined rules, or at least one indication comprises the at least one processor and the computer program code configured to: map, by the user device, of the at least one UCI into a PUSCH allocation that has a transmission configuration indication (TCI) state that matches a TCI state of a physical uplink control channel (PUCCH) associated with the at least one UCI.

Example 31. A method comprising: transmitting, by a network node to a user device, downlink control information including information indicating at least two time-domain overlapping physical uplink shared channel (PUSCH) allocations that may be used by the user device to transmit at least one uplink control information (UCI); receiving, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; wherein the at least one UCI has been mapped based on at least one of: one or more configured or pre-defined rules, or at least one indication provided by the network node to the user device, and wherein a PUSCH allocation includes resources allocated to the user device for a PUSCH transmission.

Example 32. The method of example 31, wherein the at least one UCI has been mapped based on at least one of: one or more configured or pre-defined rules, or at least one indication comprises the at least one UCI has been mapped based on at least one of the following: 1) whether the at least one UCI is scheduled for transmission on one of the PUSCHs, or 2) whether the UCI is initially carried on a physical uplink control channel (PUCCH) that can be multiplexed into one of the PUSCHs.

Example 33. The method of example 32, wherein the at least one UCI has been mapped based on at least one of: one or more configured or pre-defined rules, or at least one indication comprises the at least one UCI has been mapped into one of the PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

Example 34. The method of any of examples 31-33 wherein the at least one UCI has been mapped based on at least one of: one or more configured or pre-defined rules, or at least one indication comprises the at least one UCI has been mapped based on whether a same data block or codeword is mapped into both PUSCH allocations, or whether different data blocks or codewords are mapped to the at least two PUSCH allocations.

Example 35. The method of example 33, wherein: if a same codeword or data block is mapped across both PUSCH allocations, the at least one UCI has been mapped into both PUSCH allocations separately or across both PUSCH allocations; and if different codewords or data blocks are mapped across the at least two PUSCH allocations, the at least one UCI has been mapped into one of the PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

Example 36. The method of any of examples 31-35 wherein the at least one UCI has been mapped based on at least one of: one or more configured or pre-defined rules, or at least one indication comprises the at least one UCI has been mapped based on whether, for a same codeword, a same redundancy version (RV) of a data block is used or indicated for both PUSCH allocations, or whether different redundancy versions (RVs) of the data block are used or indicated for the at least two PUSCH allocations.

Example 37. The method of example 36, wherein: if the same redundancy version (RV) of the data block is used separately for both PUSCH allocations or across both PUSCH allocations, the at least one UCI has been mapped across both PUSCH allocations; and if different redundancy versions (RVs) of the data block are used for the at least two PUSCH allocations, the at least one UCI has been mapped into each of the PUSCH allocations separately, or mapping the UCI into one of the PUSCH allocations.

Example 38. The method of any of examples 31-37, wherein the at least one UCI has been mapped based on at least one of: one or more configured or pre-defined rules, or at least one indication comprises the at least one UCI has been mapped based on a beta offset value received by the user device within downlink control information.

Example 39. The method of example 38, wherein: a first subset of beta values are associated with mapping the at least one UCI separately into both PUSCH allocations or across both PUSCH allocations; and a second subset of beta values is associated with mapping the at least one UCI into one of the PUSCHs.

Example 40. The method of any of examples 31-39, wherein the at least one UCI has been mapped based on at least one of: one or more configured or pre-defined rules, or at least one indication comprises the at least one UCI has been mapped based on a number of layers corresponding to each PUSCH allocation.

Example 41. The method of any of examples 31-39, wherein the at least one UCI has been mapped based on at least one of: one or more configured or pre-defined rules, or at least one indication comprises the at least one UCI has been mapped based on at least one of the following: the at least one UCI is mapped into one of the PUSCH allocations that has a higher or lower starting data block or frequency; or the at least one UCI is mapped into one of the PUSCH allocations corresponding to a specific transmission-reception point (TRP) or a specific transmission configuration indication (TCI) state.

Example 42. The method of any of examples 31-41, wherein the at least one UCI has been mapped based on at least one of: one or more configured or pre-defined rules, or at least one indication comprises the at least one UCI has been mapped into a PUSCH allocation that has a transmission configuration indication (TCI) state that matches a TCI state of a physical uplink control channel (PUCCH) associated with the at least one UCI.

Example 43. An apparatus comprising: at least one processor; and at least one memory including computer program code; the at least one memory and the computer program code configured to, with the at least one processor, cause the apparatus at least to: transmit, by a network node to a user device, downlink control information including information indicating at least two time-domain overlapping physical uplink shared channel (PUSCH) allocations that may be used by the user device to transmit at least one uplink control information (UCI); receive, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; wherein the at least one UCI has been mapped based on at least one of: one or more configured or pre-defined rules, or at least one indication provided by the network node to the user device, and wherein a PUSCH allocation includes resources allocated to the user device for a PUSCH transmission.

Example 44. The apparatus of example 43, wherein the at least one UCI has been mapped based on at least one of: one or more configured or pre-defined rules, or at least one indication comprises the at least one UCI has been mapped based on at least one of the following: 1) whether the at least one UCI is scheduled for transmission on one of the PUSCHs, or 2) whether the UCI is initially carried on a physical uplink control channel (PUCCH) that can be multiplexed into one of the PUSCHs.

Example 45. The apparatus of example 44, wherein the at least one UCI has been mapped based on at least one of: one or more configured or pre-defined rules, or at least one indication comprises the at least one UCI has been mapped into one of the PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

Example 46. The apparatus of any of examples 43-45 wherein the at least one UCI has been mapped based on at least one of: one or more configured or pre-defined rules, or at least one indication comprises the at least one UCI has been mapped based on whether a same data block or codeword is mapped into both PUSCH allocations, or whether different data blocks or codewords are mapped to the at least two PUSCH allocations.

Example 47. The apparatus of example 45, wherein: if a same codeword or data block is mapped across both PUSCH allocations, the at least one UCI is mapped into both PUSCH allocations separately or across both PUSCH allocations; and if different codewords or data blocks are mapped across the at least two PUSCH allocations, the at least one UCI is mapped into one of the PUSCH allocations corresponding to at least one of: a same capability value set, a same antenna panel, a same transmission-reception point (TRP), a same control resource set pool index (CORESETpoolindex), a same CORESET group, a same set of transmission configuration indication (TCI) states, or a same set of reference signals as the PUCCH.

Example 48. The apparatus of any of examples 43-47 wherein the at least one UCI has been mapped based on at least one of: one or more configured or pre-defined rules, or at least one indication comprises the at least one UCI has been mapped based on whether, for a same codeword, a same redundancy version (RV) of a data block is used or indicated for both PUSCH allocations, or whether different redundancy versions (RVs) of the data block are used or indicated for the at least two PUSCH allocations.

Example 49. The apparatus of example 48, wherein: if the same redundancy version (RV) of the data block is used separately for both PUSCH allocations or across both PUSCH allocations, the at least one UCI has been mapped across both PUSCH allocations; and if different redundancy versions (RVs) of the data block are used for the at least two PUSCH allocations, the at least one UCI has been mapped into each of the PUSCH allocations separately, or mapping the UCI into one of the PUSCH allocations.

Example 50. The apparatus of any of examples 43-49, wherein the at least one UCI has been mapped based on at least one of: one or more configured or pre-defined rules, or at least one indication comprises the at least one UCI has been mapped based on a beta offset value received by the user device within downlink control information.

Example 51. The apparatus of example 50, wherein: a first subset of beta values are associated with mapping the at least one UCI separately into both PUSCH allocations or across both PUSCH allocations; and a second subset of beta values is associated with mapping the at least one UCI into one of the PUSCHs.

Example 52. The apparatus of any of examples 43-51, wherein the at least one UCI has been mapped based on at least one of: one or more configured or pre-defined rules, or at least one indication comprises the at least one UCI has been mapped based on a number of layers corresponding to each PUSCH allocation.

Example 53. The apparatus of any of examples 43-51, wherein the at least one UCI has been mapped based on at least one of: one or more configured or pre-defined rules, or at least one indication comprises the at least one UCI has been mapped based on at least one of the following: the at least one UCI has been mapped into one of the PUSCH allocations that has a higher or lower starting data block or frequency; or the at least one UCI has been mapped into one of the PUSCH allocations corresponding to a specific transmission-reception point (TRP) or a specific transmission configuration indication (TCI) state.

Example 54. The apparatus of any of examples 43-53, wherein the at least one UCI has been mapped based on at least one of: one or more configured or pre-defined rules, or at least one indication comprises the at least one UCI has been mapped into a PUSCH allocation that has a transmission configuration indication (TCI) state that matches a TCI state of a physical uplink control channel (PUCCH) associated with the at least one UCI.

Example 55. A non-transitory computer-readable storage medium comprising instructions stored thereon that, when executed by at least one processor, are configured to cause a computing system to: transmit, by a network node to a user device, downlink control information including information indicating at least two time-domain overlapping physical uplink shared channel (PUSCH) allocations that may be used by the user device to transmit at least one uplink control information (UCI); and receive, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; and, wherein the at least one UCI has been mapped based on at least one of: one or more configured or pre-defined rules, or at least one indication provided by the network node to the user device, and wherein a PUSCH allocation includes resources allocated to the user device for a PUSCH transmission.

Example 56. An apparatus comprising: means for transmitting, by a network node to a user device, downlink control information including information indicating at least two time-domain overlapping physical uplink shared channel (PUSCH) allocations that may be used by the user device to transmit at least one uplink control information (UCI); and means for receiving, by the network node from the user device, at least two PUSCH transmissions corresponding to the at least two time-domain PUSCH allocations, wherein the at least one UCI has been mapped to at least one of the following: one of the at least two PUSCH allocations; separately to each of the at least two PUSCH allocations; or across the at least two PUSCH allocations; and wherein the at least one UCI has been mapped based on at least one of: one or more configured or pre-defined rules, or at least one indication provided by the network node to the user device, and wherein a PUSCH allocation includes resources allocated to the user device for a PUSCH transmission.

Example 57. A non-transitory computer-readable storage medium comprising instructions stored thereon that, when executed by at least one processor, are configured to cause a computing system to: determine, by a user device in a wireless network, at least two time-domain overlapping physical uplink shared channel (PUSCH) allocations corresponding to at least two PUSCH transmissions for use in transmitting at least one uplink control information (UCI); and, map, by the user device, the UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

Example 58. An apparatus comprising: means for determining, by a user device in a wireless network, at least two time-domain overlapping physical uplink shared channel (PUSCH) allocations corresponding to at least two PUSCH transmissions for use in transmitting at least one uplink control information (UCI); and means for mapping, by the user device, the UCI to at least one of the following: one of the at least two PUSCH allocations; separately to each of the at least two PUSCH allocations; or across the at least two PUSCH allocations; wherein the mapping is based on at least one of: one or more configured or pre-defined rules, or at least one indication received by the user device from a network node, and wherein a PUSCH allocation includes resources allocated to the user device for a PUSCH transmission.

Figure 7:
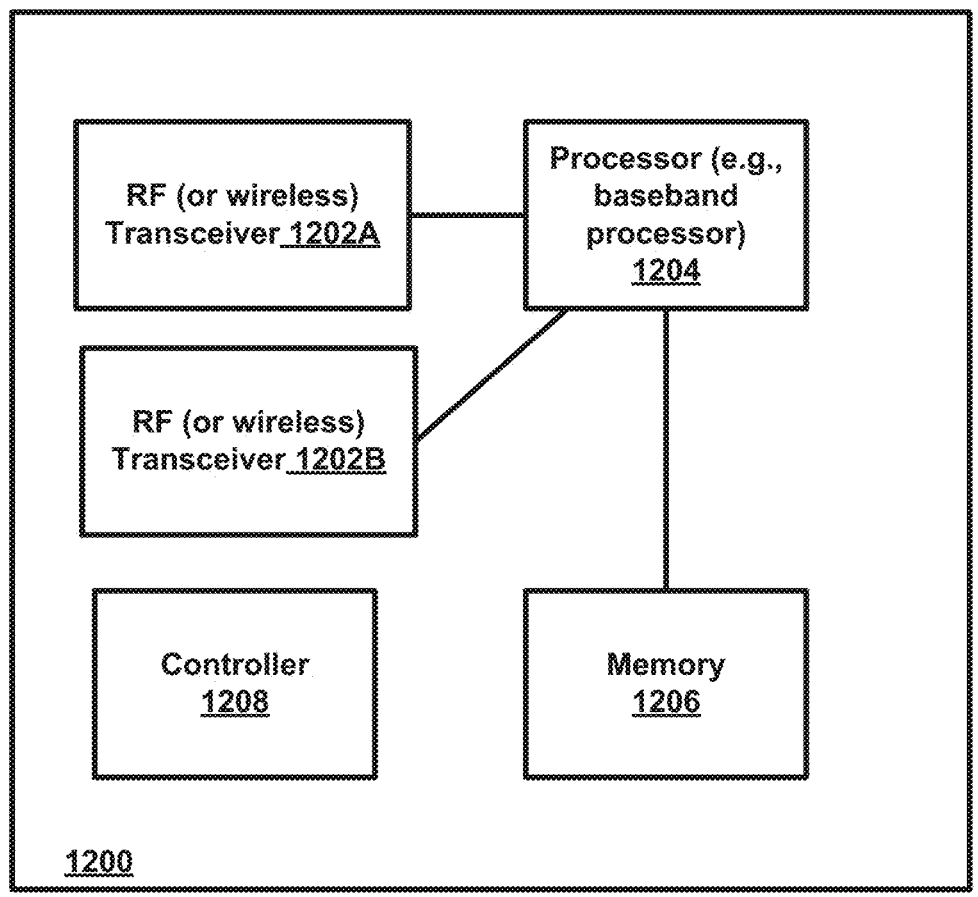
FIG. 7 is a block diagram of a wireless station (e.g., AP, BS, gNB, TRP, network node, user device, UE, or other wireless node) according to an example embodiment.

FIG. 7 is a block diagram of a network node (e.g., AP, BS, ENB, gNB, RAN node) 1200 according to an example embodiment. The wireless station 1200 may include, for example, one or more (e.g., two as shown in FIG. 7) RF (radio frequency) or wireless transceivers 1202A, 1202B, where each wireless transceiver includes a transmitter to transmit signals and a receiver to receive signals. The wireless station also includes a processor or control unit/entity (controller) 1204 to execute instructions or software and control transmission and receptions of signals, and a memory 1206 to store data and/or instructions.

Processor 1204 may also make decisions or determinations, generate frames, packets or messages for transmission, decode received frames or messages for further processing, and other tasks or functions described herein. Processor 1204, which may be a baseband processor, for example, may generate messages, packets, frames or other signals for transmission via wireless transceiver 1202 (1202A or 1202B). Processor 1204 may control transmission of signals or messages over a wireless network, and may control the reception of signals or messages, etc., via a wireless network (e.g., after being down-converted by wireless transceiver 1202, for example). Processor 1204 may be programmable and capable of executing software or other instructions stored in memory or on other computer media to perform the various tasks and functions described above, such as one or more of the tasks or methods described above. Processor 1204 may be (or may include), for example, hardware, programmable logic, a programmable processor that executes software or firmware, and/or any combination of these. Using other terminology, processor 1204 and transceiver 1202 together may be considered as a wireless transmitter/receiver system, for example.

In addition, referring to FIG. 7, a controller (or processor) 1208 may execute software and instructions, and may provide overall control for the station 1200, and may provide control for other systems not shown in FIG. 7, such as controlling input/output devices (e.g., display, keypad), and/or may execute software for one or more applications that may be provided on wireless station 1200, such as, for example, an email program, audio/video applications, a word processor, a Voice over IP application, or other application or software.

In addition, a storage medium may be provided that includes stored instructions, which when executed by a controller or processor may result in the processor 1204, or other controller or processor, performing one or more of the functions or tasks described above.

According to another example embodiment, RF or wireless transceiver(s) 1202A/1202B may receive signals or data and/or transmit or send signals or data. Processor 1204 (and possibly transceivers 1202A/1202B) may control the RF or wireless transceiver 1202A or 1202B to receive, send, broadcast or transmit signals or data.

Embodiments of the various techniques described herein may be implemented in digital electronic circuitry, or in computer hardware, firmware, software, or in combinations of them. Embodiments may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Embodiments may also be provided on a computer readable medium or computer readable storage medium, which may be a non-transitory medium. Embodiments of the various techniques may also include embodiments provided via transitory signals or media, and/or programs and/or software embodiments that are downloadable via the Internet or other network(s), either wired networks and/or wireless networks. In addition, embodiments may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, embodiments of the various techniques described herein may use a cyber-physical system (CPS) (a system of collaborating computational elements controlling physical entities). CPS may enable the embodiment and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various embodiments of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments may be implemented in a computing system that includes a back-end component, e.g., as a data server, or that includes a middleware component, e.g., an application server, or that includes a front-end component, e.g., a client computer having a graphical user interface or a Web browser through which a user can interact with an embodiment, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described embodiments have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. An apparatus comprising:
    at least one processor; and
    at least one memory storing instructions that, when executed by the at least one processor, cause the apparatus at least to:
        determine at least two time-domain overlapping physical uplink shared channel (PUSCH) allocations corresponding to at least two PUSCH transmissions for use in transmitting at least one uplink control information (UCI), wherein a PUSCH allocation includes resources allocated for a PUSCH transmission; and
        map the at least one UCI to at least one of the following:
            one of the at least two PUSCH allocations;
            separately to respective ones of the at least two PUSCH allocations; or
            across the at least two PUSCH allocations;
    wherein the mapping is based on at least one of:
    one or more configured or pre-defined rules, or at least one indication received from a network node, wherein the mapping is based on at least one of:
        whether the at least one UCI is scheduled for transmission on one or more of the at least two PUSCH allocations, or
        whether the at least one UCI is initially carried on a physical uplink control channel (PUCCH), wherein the PUCCH comprises a PUCCH that can be multiplexed into the one of the at least two PUSCH allocations,
    wherein:
        in response to the at least one UCI being scheduled for transmission on the one or more of the at least two PUSCH allocations, the mapping comprises mapping the at least one UCI into the at least two PUSCH allocations: separately to the respective ones of the at least two PUSCH allocations, or across the at least two PUSCH allocations; or
        in response to the at least one UCI being initially carried on the PUCCH that can be multiplexed into the one of the at least two PUSCH allocations, the mapping comprises mapping the at least one UCI into the one of the at least two PUSCH allocations,
            wherein the mapping comprises mapping the at least one UCI into the one of the at least two PUSCH allocations corresponding to at least one of: a same capability value set, a same antenna panel, a same transmission-reception point (TRP), a same control resource set (CORESET) pool index, a same CORESET group, a same set of transmission configuration indication (TCI) states, or a same set of reference signals as the PUCCH.

2. The apparatus of claim 1, wherein the at least one memory stores instructions that, when executed by the at least one processor, cause the apparatus to:
    transmit the at least one uplink control information via the one or more of the at least two PUSCH allocations, based on the mapping.

3. The apparatus of claim 1, wherein the mapping the at least one UCI based on at least one of: the one or more configured or pre-defined rules, or the at least one indication comprises:
    mapping the at least one UCI based on whether a same data block or codeword is mapped to the at least two PUSCH allocations, or whether different data blocks or codewords are mapped to the at least two PUSCH allocations.

4. The apparatus of claim 3, wherein:
    in response to the same data block or codeword being mapped across the at least two PUSCH allocations, the mapping comprises mapping the at least one UCI into the at least two PUSCH allocations separately or across the at least two PUSCH allocations; or
    in response to the different data blocks or codewords being mapped across the at least two PUSCH allocations, the mapping comprises mapping the at least one UCI into one of the at least two PUSCH allocations corresponding to at least one of: the same capability value set, the same antenna panel, the same TRP, the same CORESET pool index, the same CORESET group, the same set of TCI states, or the same set of reference signals as the PUCCH.

5. The apparatus of claim 1, wherein the mapping the at least one UCI based on at least one of:
    the one or more configured or pre-defined rules, or at least one indication comprises:
        mapping the at least one UCI based on whether, for a same codeword, a same redundancy version (RV) of a data block is used or indicated for the at least two PUSCH allocations, or whether different redundancy versions (RVs) of the data block are used or indicated for the at least two PUSCH allocations.

6. The apparatus of claim 1, wherein the mapping the at least one UCI based on at least one of:
    the one or more configured or pre-defined rules, or the at least one indication comprises:

mapping the at least one UCI based on a beta offset value received by the apparatus within downlink control information.

7. The apparatus of claim 6, wherein:
a first subset of beta values are associated with mapping the at least one UCI separately into the at least two PUSCH allocations or across the at least two PUSCH allocations; and
a second subset of beta values is associated with mapping the at least one UCI into the one of the at least two PUSCH allocations.

8. The apparatus of claim 1, wherein the mapping the at least one UCI based on at least one of:
the one or more configured or pre-defined rules, or the at least one indication comprises:
mapping the at least one UCI based on a number of layers corresponding to respective ones of the at least two PUSCH allocations.

9. The apparatus of claim 1, wherein the mapping the at least one UCI based on at least one of:
the one or more configured or pre-defined rules, or the at least one indication comprises:
mapping the at least one UCI into one of the at least two PUSCH allocations that has a higher or lower starting data block or frequency; or
mapping the at least one UCI into one of the at least two PUSCH allocations corresponding to a specific transmission-reception point or a specific transmission configuration indication state.

10. The apparatus of claim 1, wherein the at least one memory stores instructions that, when executed by the at least one processor, cause the apparatus to:
determine a first association between beta offsets and/or alpha values to the respective ones of the at least two PUSCH allocations; and
determine a second association between beta offsets and/or alpha values to different capability value sets or antenna panels, transmission-reception points, CORESET pool indexes or CORESET groups, sets of TCI states, or sets of reference signals; and
wherein the mapping the at least one UCI based on at least one of: the one or more configured or pre-defined rules, or the at least one indication comprises:
mapping the at least one UCI based on the first association and the second association.

11. The apparatus of claim 1, wherein the mapping the at least one UCI based on at least one of:
the one or more configured or pre-defined rules, or the at least one indication comprises:
mapping the at least one UCI into a PUSCH allocation that has a transmission configuration indication state that matches a TCI state of a physical uplink control channel associated with the at least one UCI.

12. The apparatus of claim 1, wherein the at least one indication is received from the network node by a downlink control information or a radio resource control information.

13. The apparatus of claim 1, wherein the at least one indication is received from the network node by downlink control information scheduling the at least two PUSCH allocations.

14. An apparatus comprising:
at least one processor; and
at least one memory storing instructions that, when executed by the at least one processor, cause the apparatus at least to:
transmit, to a user device, downlink control information including information indicating at least two time-domain overlapping physical uplink shared channel (PUSCH) allocations allocated to the user device for transmitting at least one uplink control information (UCI), wherein a PUSCH allocation includes resources allocated to the user device for a PUSCH transmission;
receive, from the user device, at least two PUSCH transmissions corresponding to the at least two time-domain PUSCH allocations, wherein the at least one UCI has been mapped to at least one of the following:
one of the at least two PUSCH allocations;
separately to respective ones of the at least two PUSCH allocations; or
across the at least two PUSCH allocations;
wherein the at least one UCI has been mapped based on at least one of: one or more configured or pre-defined rules, or at least one indication transmitted with the apparatus, wherein the at least one UCI has been mapped based on at least one of:
whether the at least one UCI is scheduled for transmission on one or more of the at least two PUSCH allocations, or
whether the at least one UCI is initially carried on a physical uplink control channel (PUCCH), wherein the PUCCH comprises a PUCCH that can be multiplexed into the one of the at least two PUSCH allocations,
wherein:
in response to the at least one UCI being scheduled for transmission on the one or more of the at least two PUSCH allocations, the at least one UCI has been mapped to the at least two PUSCH allocations: separately to the respective ones of the at least two PUSCH allocations, or across the at least two PUSCH allocations; or
in response to the at least one UCI being initially carried on the PUCCH that can be multiplexed into the one of the at least two PUSCH allocations, the at least one UCI has been mapped to the one of the at least two PUSCH allocations,
wherein the mapping comprises mapping the at least one UCI into the one of the at least two PUSCH allocations corresponding to at least one of: a same capability value set, a same antenna panel, a same transmission-reception point (TRP), a same control resource set (CORESET) pool index, a same CORESET group, a same set of transmission configuration indication (TCI) states, or a same set of reference signals as the PUCCH.

15. The apparatus of claim 14, wherein the at least one memory stores instructions that, when executed by the at least one processor, cause the apparatus to:
transmit, to the user device, the at least one indication for the mapping of the at least one UCI, wherein the at least one indication is transmitted via the downlink control information or via a radio resource control information.

16. A method comprising:
determining, by a user device in a wireless network, at least two physical uplink shared channel (PUSCH) allocations overlapping in time domain and corresponding to at least two PUSCH transmissions for use in transmitting at least one uplink control information wherein a PUSCH allocation (UCI), includes resources allocated to the user device for a PUSCH transmission; and mapping, by the user device, the at least one UCI to at least one of the following:
   one of the at least two PUSCH allocations;
   separately to respective ones of the at least two PUSCH allocations; or
   across the at least two PUSCH allocations;
wherein the mapping is based on at least one of: one or more configured or pre-defined rules, or at least one indication received by the user device from a network node, wherein the mapping is based on at least one of:
   whether the at least one UCI is scheduled for transmission on one or more of the at least two PUSCH allocations, or
   whether the at least one UCI is initially carried on a physical uplink control channel (PUCCH), wherein the PUCCH comprises a PUCCH that can be multiplexed into the one of the at least two PUSCH allocations,
wherein:
   in response to the at least one UCI being scheduled for transmission on the one or more of the at least two PUSCH allocations, the mapping comprises mapping the at least one UCI into the at least two PUSCH allocations: separately to the respective ones of the at least two PUSCH allocations, or across the at least two PUSCH allocations; or
   in response to the at least one UCI being initially carried on the PUCCH that can be multiplexed into the one of the at least two PUSCH allocations, the mapping comprises mapping the at least one UCI into the one of the at least two PUSCH allocations,
wherein the mapping comprises mapping the at least one UCI into the one of the at least two PUSCH allocations corresponding to at least one of: a same capability value set, a same antenna panel, a same transmission-reception point (TRP), a same control resource set (CORESET) pool index, a same CORESET group, a same set of transmission configuration indication (ICI) states, or a same set of reference signals as the PUCCH.

17. The method of claim 16, further comprising:
transmitting the at least one uplink control information via the one or more of the at least two PUSCH allocations, based on the mapping.

18. The method of claim 16, wherein the mapping the at least one UCI based on at least one of: the one or more configured or pre-defined rules, or the at least one indication comprises:
   mapping the at least one UCI based on a beta offset value received by the apparatus within downlink control information.

19. The method of claim 16, wherein the at least one indication is received from the network node by a downlink control information or a radio resource control information.

20. The method of claim 16, wherein the at least one indication is received from the network node by downlink control information scheduling the at least two PUSCH allocations.

* * * * *